US012654300B2

(12) United States Patent
VanDaalwyk et al.

(10) Patent No.: US 12,654,300 B2
(45) Date of Patent: Jun. 16, 2026

(54) TRANSVERSE AXIS ROTARY HAMMER

(71) Applicant: MILWAUKEE ELECTRIC TOOL CORPORATION, Brookfield, WI (US)

(72) Inventors: Brett J. VanDaalwyk, Milwaukee, WI (US); Andrew D. Van Hoorn, Menomonee Falls, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 18/808,277

(22) Filed: Aug. 19, 2024

(65) Prior Publication Data

US 2025/0058446 A1 Feb. 20, 2025

Related U.S. Application Data

(60) Provisional application No. 63/607,069, filed on Dec. 6, 2023, provisional application No. 63/533,406, filed on Aug. 18, 2023.

(51) Int. Cl.

*B25D 16/00* (2006.01)
*B25D 9/08* (2006.01)
*B25D 11/06* (2006.01)
*B25D 17/04* (2006.01)

(52) U.S. Cl.

CPC ............... *B25D 16/00* (2013.01); *B25D 9/08* (2013.01); *B25D 11/062* (2013.01); *B25D 17/04* (2013.01); *B25D 2250/301* (2013.01)

(58) Field of Classification Search

CPC ........ B25D 9/08; B25D 11/062; B25D 16/00; B25D 17/04; B25D 2250/301; B25F 5/02

See application file for complete search history.

(56) References Cited

U.S. PATENT DOCUMENTS 2,542,038 A * 2/1951 Lewis ........................ B25F 5/02 403/96
3,571,874 A * 3/1971 Von Arz .................... B25F 5/02 29/81.17
3,650,336 A * 3/1972 Koehler ............... B25D 16/003 173/110

(Continued)

FOREIGN PATENT DOCUMENTS

DE 102014207713 A1 10/2015
EP 0199842 A1 11/1986

(Continued)

*Primary Examiner* — Shelley M Self
*Assistant Examiner* — David G Shutty
(74) *Attorney, Agent, or Firm* — Quarles & Brady LLP

(57) ABSTRACT

Some aspects of the disclosure provide a rotary hammer that is configured to impart impacts to a tool bit. The rotary hammer includes a housing, a motor disposed within the housing, a spindle, and an impact mechanism. The housing includes a first end that can have a handle and a second end that are configured to receive the tool bit. The housing extends along a direct direction between the first and second end. The spindle is disposed within the housing and rotatable by the motor. The spindle defines a spindle axis that is transverse relative to the first direction. The impact mechanism includes a piston and a striker. The piston is at least partially received within the spring for reciprocation therein. The striker is received within the spindle for reciprocation in response to reciprocation of the piston.

18 Claims, 23 Drawing Sheets

(56) References Cited

U.S. PATENT DOCUMENTS

| | | | | | |
|---|---|---|---|---|---|
| 3,720,269 | A * | 3/1973 | Wanner | B25D 16/006 | 173/205 |
| 3,828,863 | A * | 8/1974 | Bleicher | B25D 16/006 | 173/48 |
| 3,850,255 | A * | 11/1974 | Koehler | B25D 16/003 | 173/110 |
| 4,346,769 | A * | 8/1982 | Simpson | B25D 16/00 | 173/100 |
| 4,366,869 | A * | 1/1983 | Bereiter | B25D 11/005 | 173/48 |
| 4,502,824 | A * | 3/1985 | Dohse | B23Q 3/12 | 173/13 |
| 4,719,976 | A * | 1/1988 | Bleicher | B25D 16/003 | 173/205 |
| 4,751,970 | A | 6/1988 | Hecker et al. | | |
| 4,770,254 | A * | 9/1988 | Kominami | B25F 5/02 | 173/109 |
| 6,463,824 | B1 | 10/2002 | Prell et al. | | |
| 6,666,284 | B2 * | 12/2003 | Stirm | B25D 16/006 | 173/104 |
| 6,913,089 | B2 * | 7/2005 | Stirm | B25D 16/00 | 173/104 |
| 6,971,455 | B2 * | 12/2005 | Shibata | B25D 16/006 | 173/48 |
| 7,021,401 | B2 * | 4/2006 | Droste | B25D 16/00 | 173/104 |
| 7,077,736 | B2 | 7/2006 | Uzumeu et al. | | |
| 7,306,049 | B2 * | 12/2007 | Soika | B25D 16/006 | 173/48 |
| 7,719,146 | B2 * | 5/2010 | Takahashi | B25F 5/02 | 310/40 MM |
| 7,726,414 | B2 * | 6/2010 | Berger | B25D 11/125 | 173/132 |
| 8,172,235 | B2 * | 5/2012 | Furusawa | B25D 17/088 | 279/22 |
| 8,261,850 | B2 * | 9/2012 | Fuchs | B25D 17/00 | 173/90 |
| 8,319,379 | B2 * | 11/2012 | Onose | B25B 21/00 | 200/332.2 |
| 8,403,075 | B2 * | 3/2013 | Schlesak | B25D 16/00 | 173/205 |
| 8,925,646 | B2 * | 1/2015 | Seith | B25F 5/02 | 173/217 |
| 9,016,395 | B2 | 4/2015 | Scott | | |
| 9,022,888 | B2 | 5/2015 | McClung | | |
| 9,138,842 | B2 | 9/2015 | Su et al. | | |
| 9,193,054 | B2 | 11/2015 | Su et al. | | |
| 9,199,389 | B2 * | 12/2015 | Myrhum, Jr. | B26D 5/12 | |
| 9,266,226 | B2 | 2/2016 | Timmons | | |
| 9,550,283 | B2 | 1/2017 | Johnson | | |
| 9,550,284 | B2 | 1/2017 | Seith et al. | | |
| 9,579,782 | B2 | 2/2017 | Tussing | | |
| 9,592,600 | B2 * | 3/2017 | Seith | B25F 5/02 | |
| 9,751,176 | B2 | 9/2017 | McRoberts et al. | | |
| 10,011,008 | B2 | 7/2018 | Herr et al. | | |
| 10,131,037 | B2 | 11/2018 | Seith et al. | | |
| 10,150,210 | B2 | 12/2018 | Rubens et al. | | |
| 10,220,493 | B2 | 3/2019 | Seith et al. | | |
| 10,478,930 | B2 | 11/2019 | Saur et al. | | |
| 10,478,959 | B2 | 11/2019 | Brennenstuhl et al. | | |
| 10,507,570 | B2 * | 12/2019 | Ueda | B25F 5/02 | |
| 10,576,593 | B2 | 3/2020 | McRoberts et al. | | |
| 10,926,383 | B2 | 2/2021 | Scott et al. | | |
| 12,005,556 | B2 * | 6/2024 | Shiina | B25D 16/006 | |
| 2006/0222541 | A1 | 10/2006 | Greitmann et al. | | |
| 2011/0278034 | A1 * | 11/2011 | Song | B25F 5/001 | 173/93.5 |
| 2011/0278036 | A1 | 11/2011 | Song et al. | | |
| 2014/0216775 | A1 | 8/2014 | Seith et al. | | |
| 2014/0262394 | A1 | 9/2014 | Scott et al. | | |
| 2014/0262396 | A1 | 9/2014 | McClung | | |
| 2015/0174744 | A1 | 6/2015 | Scott et al. | | |
| 2017/0106517 | A1 * | 4/2017 | Machida | B25D 11/102 | |
| 2021/0046620 | A1 | 2/2021 | Teng et al. | | |
| 2021/0138616 | A1 | 5/2021 | Scott et al. | | |
| 2022/0080561 | A1 | 3/2022 | Banholzer et al. | | |

FOREIGN PATENT DOCUMENTS

| | | | | |
|---|---|---|---|---|
| EP | 0490102 | A1 | 6/1992 | |
| EP | 2394765 | B1 | 1/2014 | |
| GB | 2160810 | A * | 1/1986 | B25D 16/00 |
| WO | WO-2012144568 | A1 * | 10/2012 | B25D 9/08 |

* cited by examiner

TRANSVERSE AXIS ROTARY HAMMER

CROSS-REFERENCE TO RELATED APPLICATIONS

This application claims priority to and incorporates by reference U.S. Provisional Patent Application No. 63/533,406, filed Aug. 18, 2023, and U.S. Provisional Patent Application No. 63/607,069, filed Dec. 6, 2023.

FIELD OF INVENTION

The present disclosure relates to power tool, and more particularly to power tools that rotate or provide impacts to a tool bit (e.g., rotary hammer, demolition hammers, hammer chisels, etc.).

BACKGROUND OF THE DISCLOSURE

Rotary hammers typically include a rotatable spindle, a reciprocating piston within the spindle, and a striker that is selectively reciprocable within the piston in response to an air pocket developed between the piston and the striker. Rotary hammers also typically include an anvil that is impacted by the striker when the striker reciprocates within the piston. The impact between the striker and the anvil is transferred to a tool bit, causing it to impact and perform work on a work piece.

SUMMARY OF THE DISCLOSURE

The disclosure provides, in one aspect, a rotary hammer configured to impart impacts to a tool bit. The rotary hammer includes a housing including a first end having a handle and a second end configured to receive the tool bit, the housing extending along a first direction between the first end and the second end. The rotary hammer further includes a motor disposed within the housing and a spindle disposed within the housing and rotatable by the motor, the spindle defining a spindle axis that is transverse relative to the first direction. The rotary hammer further includes an impact mechanism including a piston at least partially received within the spindle for reciprocation therein, and a striker is received within the spindle for reciprocation in response to reciprocation of the piston.

In some embodiments, the spindle axis is substantially perpendicular to at least one of the first direction and an axis of the motor. In some embodiments, the handle defines a handle axis that is substantially parallel to the first direction. In some embodiments, the handle axis is at an angle of less than about 10 degrees from the first direction. In some embodiments, an actuator is arranged the handle so that an activation direction of the actuator is substantially parallel with the spindle axis. In some embodiments, the rotary hammer further includes a sleeve positioned in the housing and coaxial with the spindle, wherein the piston is configured to reciprocate within the sleeve and the spindle. In some embodiments, the sleeve is rotationally fixed relative to the housing and is coupled to the spindle by a collar. In some embodiments, the impact mechanism further includes an anvil and the striker is moveably disposed within a cavity defined in the piston, the striker moving to contact the anvil to impart the impact to the tool bit. In some embodiments, the impact mechanism further includes an oscillation mechanism configured to convert rotational motion of the motor into reciprocating linear motion that moves the piston. In some embodiments, the oscillation mechanism is a wobble assembly having wobble bearing that is rotated by an intermediate shaft of a transmission that transmits torque from the motor to the spindle. In some embodiments, a rotational axis of the wobble bearing is at least one of substantially parallel to the spindle axis and substantially perpendicular to the first direction. In some embodiments, the rotary hammer further includes a gearcase that is disposed in the housing, the spindle and the impact mechanism being disposed in the gearcase. In some embodiments, the rotary hammer further includes a lever that is pivotally coupled to the housing.

The disclosure provides, in another aspect, a rotary hammer configured to impart impacts to a tool bit. The rotary hammer includes a housing including a first end having a handle and a second end having a chuck, the handle defining a handle axis. The rotary hammer further includes a motor disposed within the housing and a spindle disposed within the housing and rotatable by the motor, the spindle defining a spindle axis that is transverse to the handle axis. The rotary hammer further includes a transmission configured to transfer torque from the motor to the spindle, an impact mechanism including a piston at least partially received within the spindle for reciprocation therein, and a striker received within the spindle and configured to impart an impact to the tool bit in response to reciprocation of the piston.

In some aspects, the handle axis is an angle of less than about 15 degrees relative to a first direction extending from the first end of the housing to the second end of the housing. In some embodiments, the motor includes a shaft defining a shaft axis that is substantially orthogonal to at least one of the spindle axis and the handle axis. In some embodiments, the handle includes a trigger having a pull direction that is substantially parallel to the spindle axis. In some embodiments, the impact mechanism further includes an oscillation mechanism arranged between the transmission and the piston, the oscillation mechanism configured to convert torque from the motor into reciprocation of the piston so that the striker imparts impacts to the tool bit. In some embodiments, the chuck is moveable along the spindle axis between a first position configured to retain the tool bit and a second position configured to release the tool bit.

The disclosure provides, in yet another aspect, a rotary hammer configured to impart impacts to a tool bit. The rotary hammer includes a housing including a first end having a handle and a second end configured to receive the tool bit, the housing extending along a first direction between the first end and the second end and the handle defining a handle axis that is substantially parallel to the first direction. The rotary hammer further includes an output assembly disposed in the housing at the second end and a spindle configured to rotate the tool bit about a spindle axis that is substantially perpendicular to the first direction. The output assembly includes an impact mechanism including a piston at least partially received within the spindle for reciprocation therein, an oscillation mechanism configured to reciprocate the piston, and a striker received within the spindle for reciprocation in response to reciprocation of the piston. The output assembly further includes a transmission configured to transmit an input torque to the spindle and the impact mechanism. The rotary hammer further includes a motor positioned between the output assembly and the handle to provide the input torque to the transmission.

The disclosure provides, in still another aspect, a rotary hammer adapted to impart axial impact to a tool bit. The rotary hammer includes a housing, a motor positioned within the housing, a spindle, a transmission, and an axial impact mechanism. The motor includes a motor shaft configured to rotate about a motor axis. The spindle is coupled to the motor shaft. The spindle defines a spindle axis orientated perpendicular to the motor shaft axis. The transmission is configured to transfer torque from the motor shaft to the spindle. The axial impact mechanism includes a piston and an anvil. The piston is at least partially received within the spindle for reciprocation therein. The anvil is received within the spindle for reciprocation in response to reciprocation of the piston. The anvil imparts axial impacts to the tool bit in response to the reciprocation of the piston.

The disclosure provides, in yet another aspect, a rotary hammer adapted to impart axial impact to a tool bit. The rotary hammer includes a housing, a motor positioned within the housing, a spindle, a transmission, and an axial impact mechanism. The motor includes a motor shaft configured to rotate about a motor axis. The spindle is coupled to the motor shaft. The transmission is configured to transfer torque from the motor shaft to the spindle. The axial impact mechanism includes a sleeve, a piston, and an anvil. The sleeve is positioned in the housing coaxial with the spindle. The piston at least partially received within the sleeve and the spindle for reciprocation between the sleeve and the spindle. The anvil is received within the spindle for reciprocation in response to reciprocation of the piston. The anvil imparts axial impacts to the tool bit in response to the reciprocation of the piston.

BRIEF DESCRIPTION OF THE DRAWINGS

The accompanying drawings, which are incorporated in and form a part of this specification, illustrate embodiments of the disclosure and, together with the description, serve to explain the principles of embodiments of the disclosure.

Figure 1:
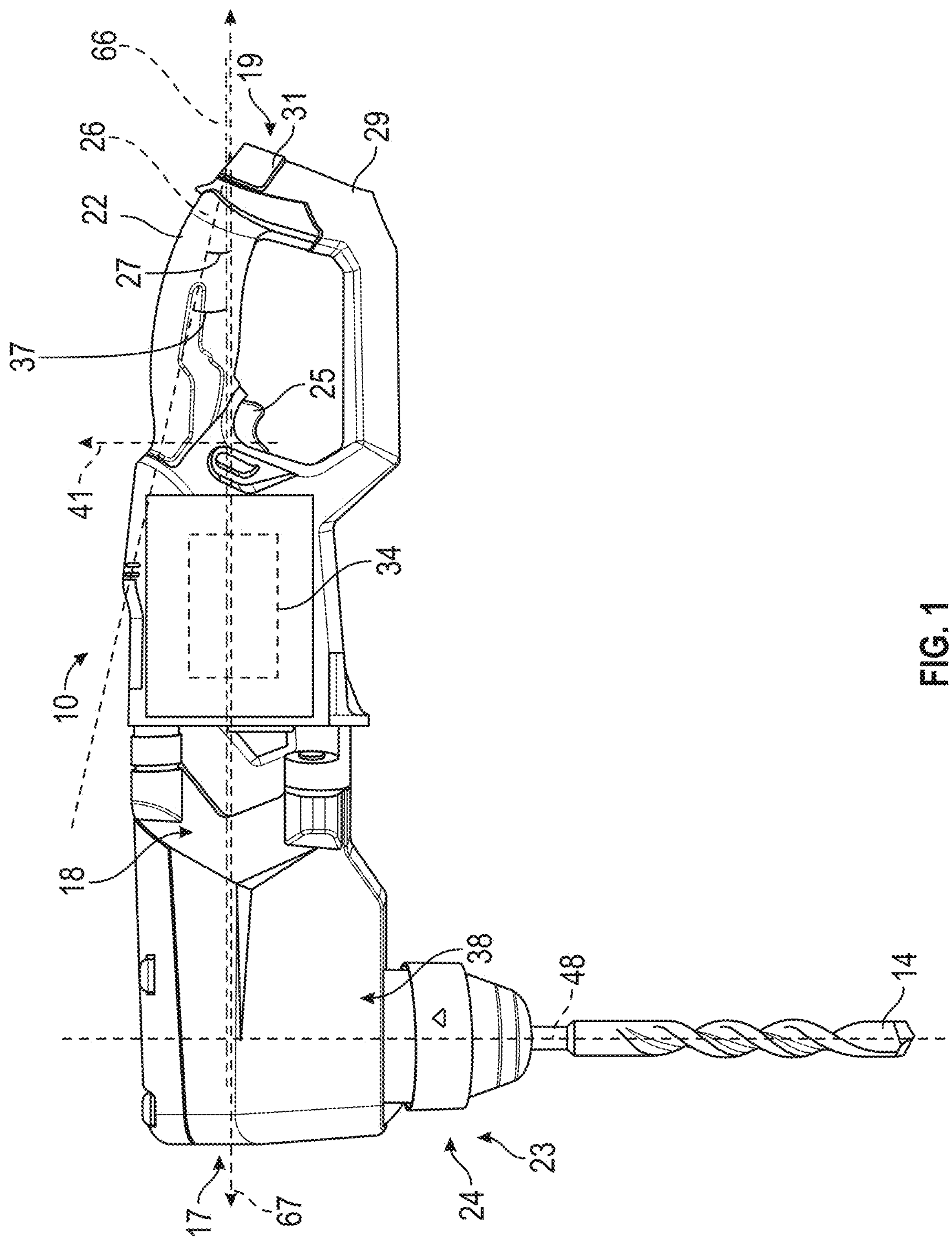
FIG. 1 is a side view of a rotary hammer in accordance with aspects of the disclosure.
Figure 2:
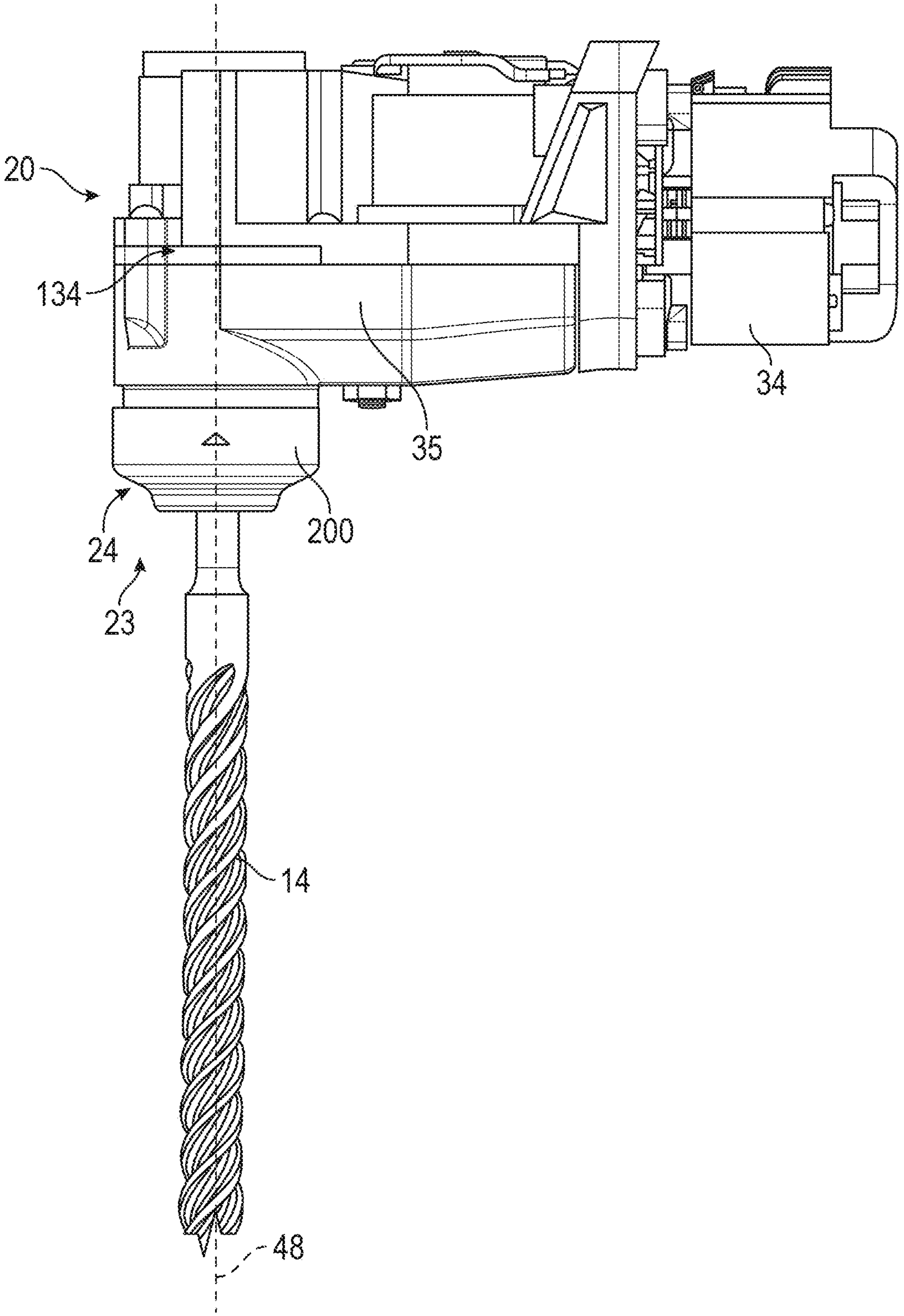
FIG. 2 is a side view of an output assembly configured for use with the rotary hammer of FIG. 1, according to aspects of the disclosure.

Before any embodiments of the disclosure are explained in detail, it is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting.

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art. It is understood that the various features and embodiments described in the present disclosure may be mixed or interchanged into different combinations of features and embodiments. In other words, the specific combinations of features disclosed herein are not intended to be limiting but are purely for the sake of illustrating example embodiments. Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of “including,” “comprising,” or “having” and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

In some implementations, devices or systems disclosed herein can be utilized, manufactured, installed, etc. using methods embodying aspects of the disclosed technology. Correspondingly, any description herein of particular features, capabilities, or intended purposes of a device or system should be considered to disclose, as examples of the disclosed technology a method of using such devices for the intended purposes, a method of otherwise implementing such capabilities, a method of manufacturing relevant components of such a device or system (or the device or system as a whole), and a method of installing disclosed (or otherwise known) components to support such purposes or capabilities. Similarly, unless otherwise indicated or limited, discussion herein of any method of manufacturing or using for a particular device or system, including installing the device or system, should be understood to disclose, as examples of the disclosed technology, the utilized features and implemented capabilities of such device or system.

The following discussion is presented to enable a person skilled in the art to make and use embodiments of the disclosure. Various modifications to the illustrated embodiments will be readily apparent to those skilled in the art, and the generic principles herein can be applied to other embodiments and applications without departing from embodiments of the disclosure. Thus, embodiments of the disclosure are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the disclosure. Skilled artisans will recognize the examples provided herein have many useful alternatives and fall within the scope of embodiments of the disclosure.

As used herein, unless otherwise limited or defined, "or" indicates a non-exclusive list of components or operations that can be present in any variety of combinations, rather than an exclusive list of components that can be present only as alternatives to each other. For example, a list of "A, B, or C" indicates options of: A; B; C; A and B; A and C; B and C; and A, B, and C. Correspondingly, the term "or" as used herein is intended to indicate exclusive alternatives only when preceded by terms of exclusivity, such as "only one of," or "exactly one of." For example, a list of "only one of A, B, or C" indicates options of: A, but not B and C; B, but not A and C; and C, but not A and B. In contrast, a list preceded by "one or more" (and variations thereon) and including "or" to separate listed elements indicates options of one or more of any or all of the listed elements. For example, the phrases "one or more of A, B, or C" and "at least one of A, B, or C" indicate options of: one or more A; one or more B; one or more C; one or more A and one or more B; one or more B and one or more C; one or more A and one or more C; and one or more A, one or more B, and one or more C. Similarly, a list preceded by "a plurality of" (and variations thereon) and including "or" to separate listed elements indicates options of one or more of each of multiple of the listed elements. For example, the phrases "a plurality of A, B, or C" and "two or more of A, B, or C" indicate options of: one or more A and one or more B; one or more B and one or more C; one or more A and one or more C; and one or more A, one or more B, and one or more C.

Also as used herein, unless otherwise limited or defined, "integral" and derivatives thereof (e.g., "integrally") describe elements that are manufactured as a single piece without fasteners, adhesive, or the like to secure separate components together. For example, an element that is stamped, cast, or otherwise molded as a single-piece component from a single piece of sheet metal or using a single mold, without rivets, screws, other fasteners, or adhesive to hold separately formed pieces together is an integral (and integrally formed) element. In contrast, an element formed from multiple pieces that are separately formed initially then later connected together, is not an integral (or integrally formed) element.

Also as used herein, unless otherwise limited or defined, "substantially parallel" indicates a direction that is within ±12 degrees of a reference direction (e.g., within ±6 degrees or ±3 degrees), inclusive. Similarly, unless otherwise limited or defined, "substantially perpendicular" similarly indicates a direction that is within ±12 degrees of perpendicular a reference direction (e.g., within ±6 degrees or ±3 degrees), inclusive. Correspondingly, "substantially vertical" indicates a direction that is substantially parallel to the vertical direction, as defined relative to the reference system (e.g., a local direction of gravity, by default), with a similarly derived meaning for "substantially horizontal" (relative to the horizontal direction). Discussion of directions "transverse" to a reference direction indicate directions that are not substantially parallel to the reference direction. Correspondingly, some transverse directions may be perpendicular or substantially perpendicular to the relevant reference direction.

As used herein, unless otherwise limited or specified, "substantially identical" refers to two or more components or systems that are manufactured according to the same process and specification, with variation between the components or systems that are within the limitations of acceptable tolerances for the relevant process or specification. For example, two components can be considered to be substantially identical if the components are manufactured according to the same standardized manufacturing steps, with the same materials, and within the same acceptable dimensional tolerances (e.g., as specified for a particular process or product).

The term "about," as used herein, refers to variation in the numerical quantity that may occur, for example, through typical measuring and manufacturing procedures used for articles of footwear or other articles of manufacture that may include embodiments of the disclosure herein; through inadvertent error in these procedures; through differences in the manufacture, source, or purity of the ingredients used to make the compositions or mixtures or carry out the methods; and the like. Throughout the disclosure, the terms "near," "about," and "approximately" refer to a range of values±15% of the numeric value that the term precedes.

As also used herein, unless otherwise defined or limited, ordinal numbers are used herein for convenience of reference based generally on the order in which particular components are presented for the relevant part of the disclosure. In this regard, for example, designations such as "first," "second," etc., generally indicate only the order in which the relevant component is introduced for discussion and generally do not indicate or require a particular spatial arrangement, functional or structural primacy or order.

The disclosed power tool will be described with respect to an example rotary. However, it should be understood that any one or more example embodiments of the disclosed transverse axial rotary hammer could be incorporated in alternate forms of a power tool. Furthermore, it should be understood that one or more example embodiments of the disclosed power tool can be used outside of the context of a transverse axial rotary hammer and could more generally be used in a mechanism and/or mechanisms imparts axial impacts.

The disclosed power tool will be described with respect to an example rotary hammer. However, it should be understood that any one or more example embodiments of the disclosed rotary hammer can be incorporated in alternate forms of a power tool, for example, hammer drills, hammer chisel, demolition hammers, etc. Furthermore, it should be understood that one or more example embodiments of the disclosed power tool could be used outside of the context of a rotary hammer and could more generally be used in a mechanism that imparts both rotational motion and axial impacts to a tool bit.

Rotary hammers are power tools that are configured to impart both rotational motion and axial impacts to a tool bit, independently or simultaneously. In general, a rotary hammer includes a housing having a handle at a first end of the housing and an output assembly at a second end of the housing that is opposite the first end. The handle generally includes a trigger that is actuatable by an operator to control operation of the rotary hammer. The housing defines a first direction (e.g., a longitudinal direction, which may correspond with a longitudinal axis) extending between the first end and the second end. A motor is disposed in the housing and is operatively coupled to the output assembly having an output end. The output assembly includes a drive system that is configured to convert rotational motion of the motor to impart both rotational motion and axial impacts of a tool bit. Said differently, the output assembly includes a drive system that is converts rotational motion of the motor into both rotational motion and axial impacts of a tool bit. Correspondingly, the output end can include a chuck that holds the tool bit during operation. The chuck is coupled to a spindle that rotates the tool bit about a spindle axis and an axial impact mechanism to impart axial impacts to the tool bit.

According to aspects of the disclosure, the spindle is oriented so that the spindle axis is transverse to the first direction to allow for improved ergonomics and force application by an operator in certain drilling applications (e.g., in floors, ceilings, obstructed areas, etc.). For example, the spindle axis can be substantially perpendicular or at another non-zero angle relative to the first direction. In some cases, an axial impact mechanism can be oriented to be substantially parallel with the spindle axis to allow for more efficient transfer of impact energy. This differs from conventional rotary hammer designs that typically orient a spindle parallel to the first direction, and which require additional adaptors or end effectors to allow for transverse drilling. Such adaptors and end effector generally have to reorient the rotation of the spindle rotation, and also the energy of an axial impact, leading to losses in energy transfer and lowered tool performance.

In some instances, a handle of a rotary hammer can also be oriented to extend generally along the first direction of the housing. For example, in cases, the handle may extend along a handle axis that is at a first angle relative to the first direction. The first angle can be an acute angle, and more specifically, between about 5 degree and about 15 degrees. Correspondingly a switch (e.g., a trigger, button, lever, etc.) can be supported on the handle so that an actuation direction of switch is transverse to the first direction. More specifically, the actuation direction can be substantially parallel (e.g., within about 15 degrees of parallel) with the spindle axis.

FIG. 1 illustrates a rotary hammer 10 that is operable to rotate and impart axial impacts on a tool bit 14, such as a drill bit, for drilling holes in a workpiece or work surface. While present disclosure is described in reference to the rotary hammer 10, it is appreciated that the concepts disclosed herein are also applicable power tools generally (e.g., hammer chisels, demolition hammers, etc.). The rotary hammer 10 includes a housing 18 having a first end 19 with a handle 22 and a second end 17 having an output assembly 23. The housing 18 extends between the first end 19 to the second end 17 to define a first direction 67. The first direction 67 can corresponding with a longitudinal direction (e.g., a longitudinal axis of the housing 18). For reference, the first end 19 of the housing 18 is considered a rear of the rotary hammer 10 and the second end 17 of the housing 18 is considered a front of the rotary hammer 10.

The output assembly 23 includes a chuck 24 to which the tool bit 14 is secured. The handle 22 is disposed opposite the output assembly 23 and allows a user to grip and maneuver the rotary hammer 10 in tight spaces, such as under machinery or between a concrete wall and a mechanical wall, as discussed in greater detail below. The handle 22 can include an actuator 25 that allows an operator to operate the rotary hammer 10 (e.g., to control a flow of power to a motor). In this case, the actuator 25 is configured as a trigger, however, other types of actuators can be used.

To improve ergonomics and allow for improved control of the rotary hammer 10, the handle can be arranged to be substantially parallel to the first direction 67 or to be transverse to a spindle axis (e.g., spindle axis 48), as described in greater detail below. For example, in the illustrated embodiment of the rotary hammer 10, the handle 22 extends substantially parallel with the first direction 67. More specifically, the handle 22 extends to define a handle axis 26 that is at a first angle 27 relative to the first direction 67 or the spindle axis 48. In some examples, the first angle 27 is an acute angle that can be less than about 15 degrees, and more specifically about 10 degrees. In other examples, the first angle 27 is between about 0 to 5 degrees, about 5 to 10 degrees, about 10 to 15 degrees, about 15 to 20 degrees, about 20 to 25 degrees, or any angle greater than 0 degrees and less than 90 degrees. Further, in some examples, the first angle can be less than 0 degrees. In some examples, the first angle 27 is about 15 degrees. Correspondingly, the actuator 25 can be arranged on the handle 22 to have an actuation direction 41 (e.g., a push or a pull direction) that is substantially perpendicular the first direction 67, for example, to be substantially parallel or substantially perpendicular to the spindle axis. In other embodiments, the handle 22 may be oriented differently, for example so that the handle axis 26 is substantially parallel with a spindle axis or substantially perpendicular to the first direction 67. Correspondingly, the actuator 25 can be arranged on the handle 22 so that the actuation direction 41 is substantially parallel with the first direction, for example to be substantially perpendicular to the spindle axis.

The rotary hammer 10 may also include a power supply 29 removably coupled to the housing 18 that provides electrical power to the rotary hammer 10. In some embodiments, the power supply 29 is a removable power tool battery pack 31 that is interchangeable with other power tools like the rotary hammer 10. The battery pack 31 may include any of a number of different nominal voltages (e.g., 12V, 18V, etc.), and may be configured having any of a number of different chemistries (e.g., lithium-ion, nickel-cadmium, etc.). Alternatively, the rotary hammer 10 may be powered by a remote power source (e.g., a household electrical outlet) through a power cord. Operation of the actuator 25 can control a flow of power from the power supply 29 to a motor to operate the rotary hammer 10.

With reference to FIGS. 1-4, the rotary hammer 10 also includes a motor 34 positioned within the housing 18 (e.g., within a gearcase disposed within the housing 18), a rotatable spindle 38 to which the chuck is attached, a transmission 50 between the motor 34 and the spindle 38 for transmitting torque from the motor 34 to the spindle 38, causing the spindle 38 to rotate when the motor 34 is activated. The transmission 50 is illustrated as being a geartrain; however, other types of transmission systems can used, for example, belt drives, chain drives, etc. The rotary hammer 10 further includes an impact mechanism 54 (e.g., an axial impact mechanism), which in some cases, can be driven by the transmission 50. In some embodiments, the transmission 50 and the impact mechanism 54 are positioned in a gear case 20 including an upper gear case 33 (e.g., a first gearcase section) and a lower gear case 35 (e.g., a second gearcase section). The gear case 20 is positioned in the housing 18 at the second end 17 and is part of the output assembly 23. In some embodiments, the gear case 20 may protrude from the housing 18 at the second end 17 (e.g., the gear case 20 may be visible outside of the housing).

Figure 3A:
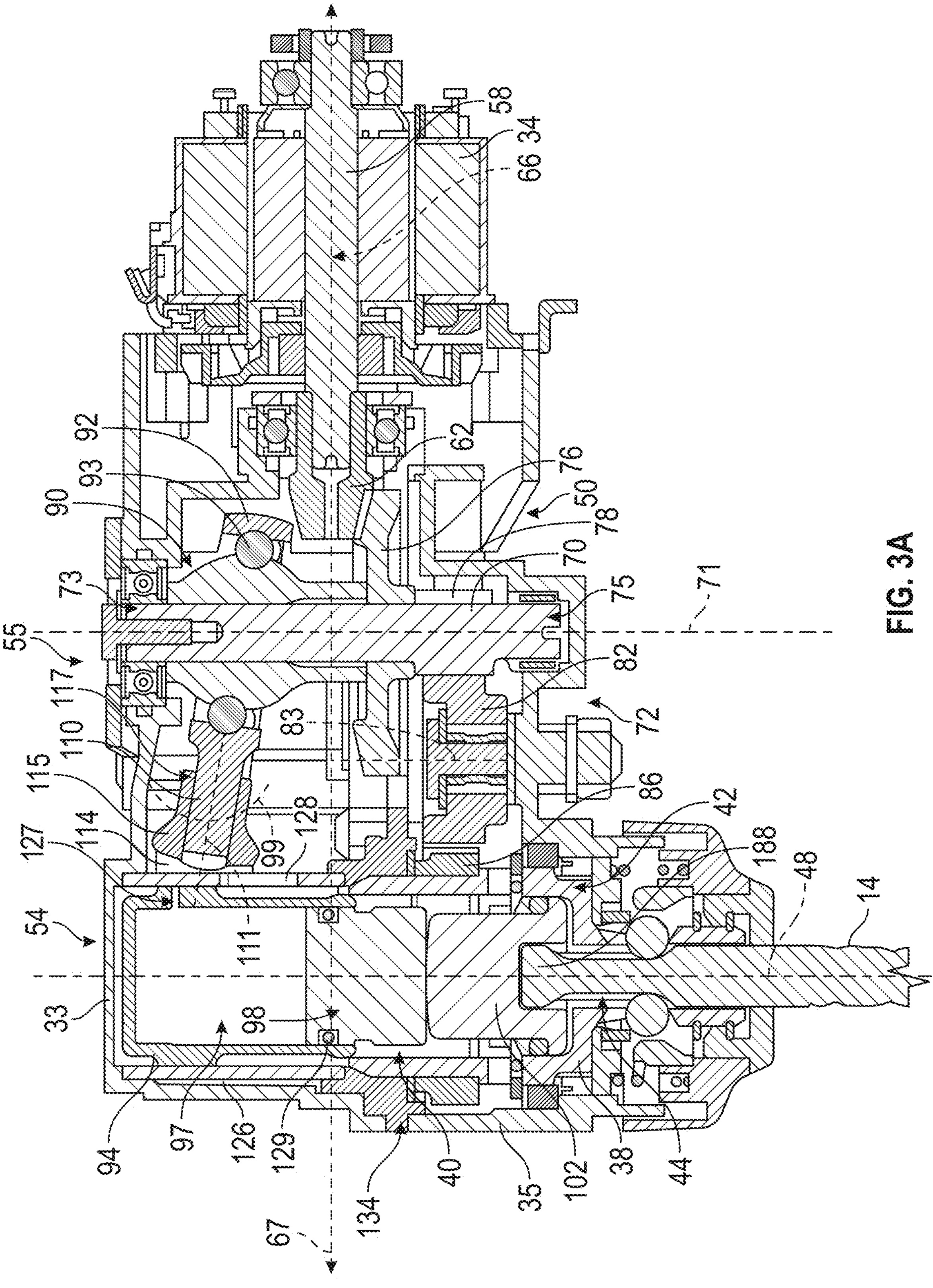
FIG. 3A is a cross-sectional view of the output assembly of FIG. 2.
Figure 3B:
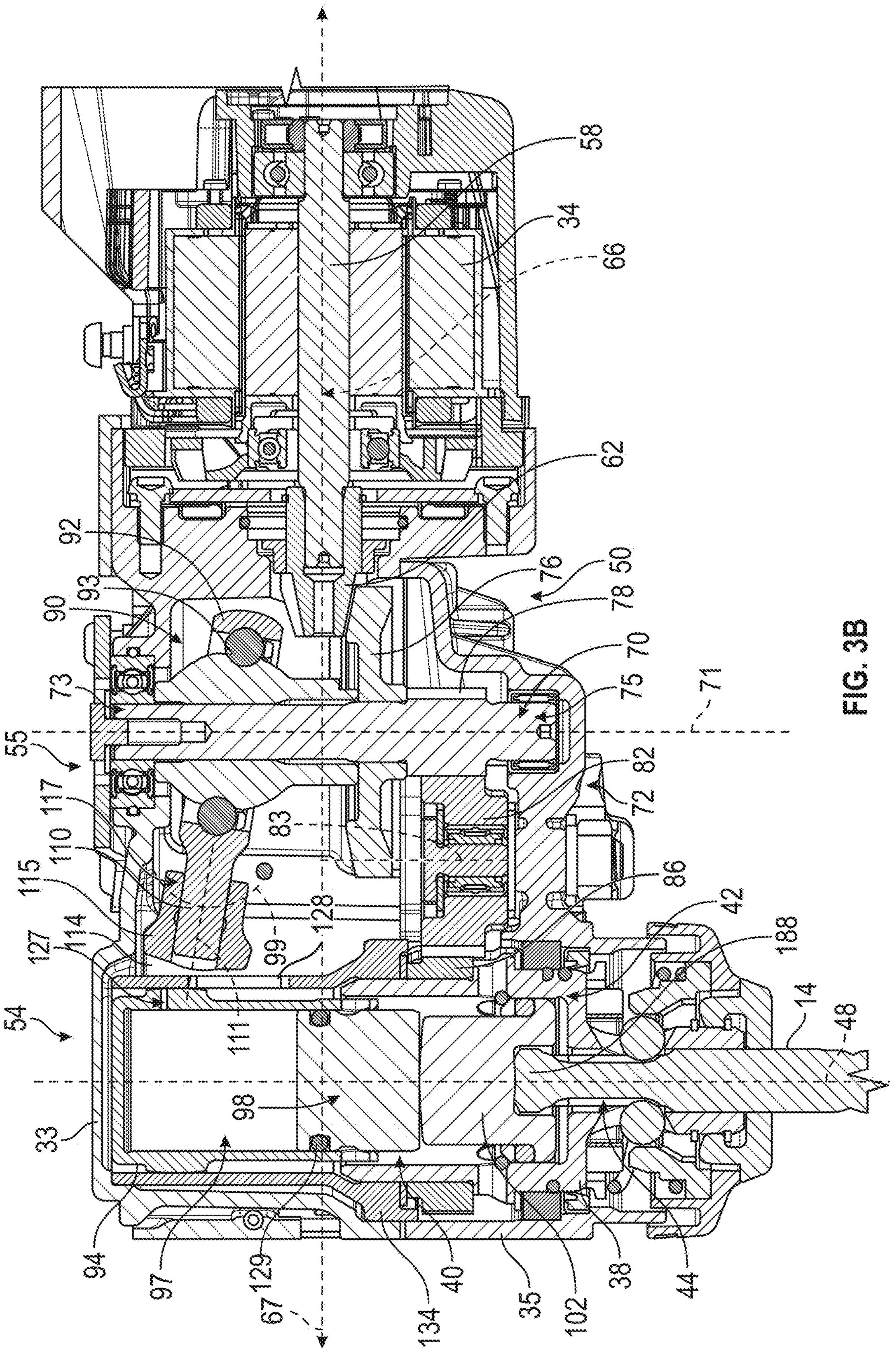
FIG. 3B is a cross-sectional view of an example output assembly for use with the rotary hammer of FIG. 1.
Figure 4:
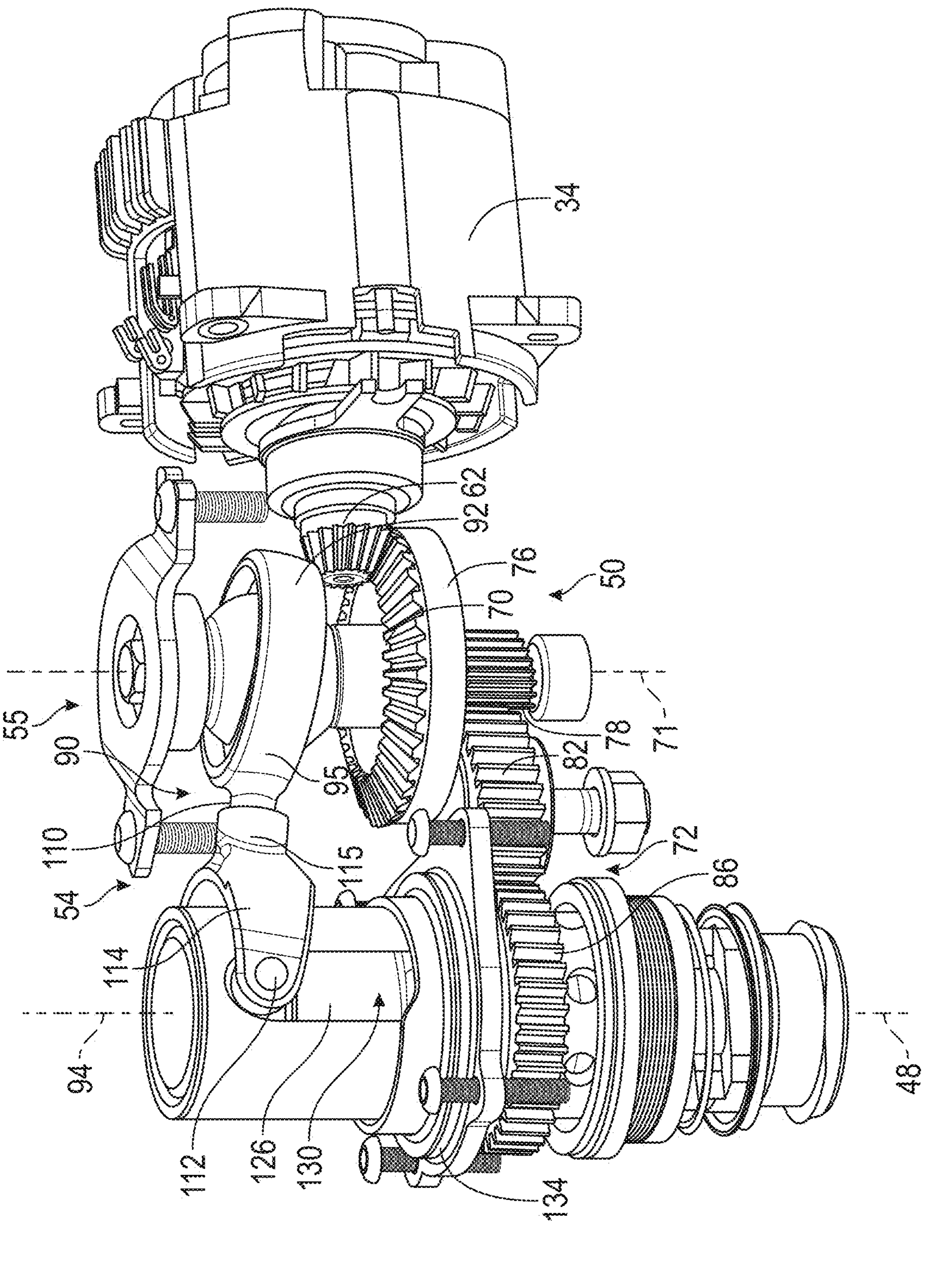
FIG. 4 is a perspective view of the output assembly of FIG. 3A, with a housing removed to show a motor assembly, a transmission assembly, and an impact mechanism of the rotary hammer of FIG. 2.
Figure 5:
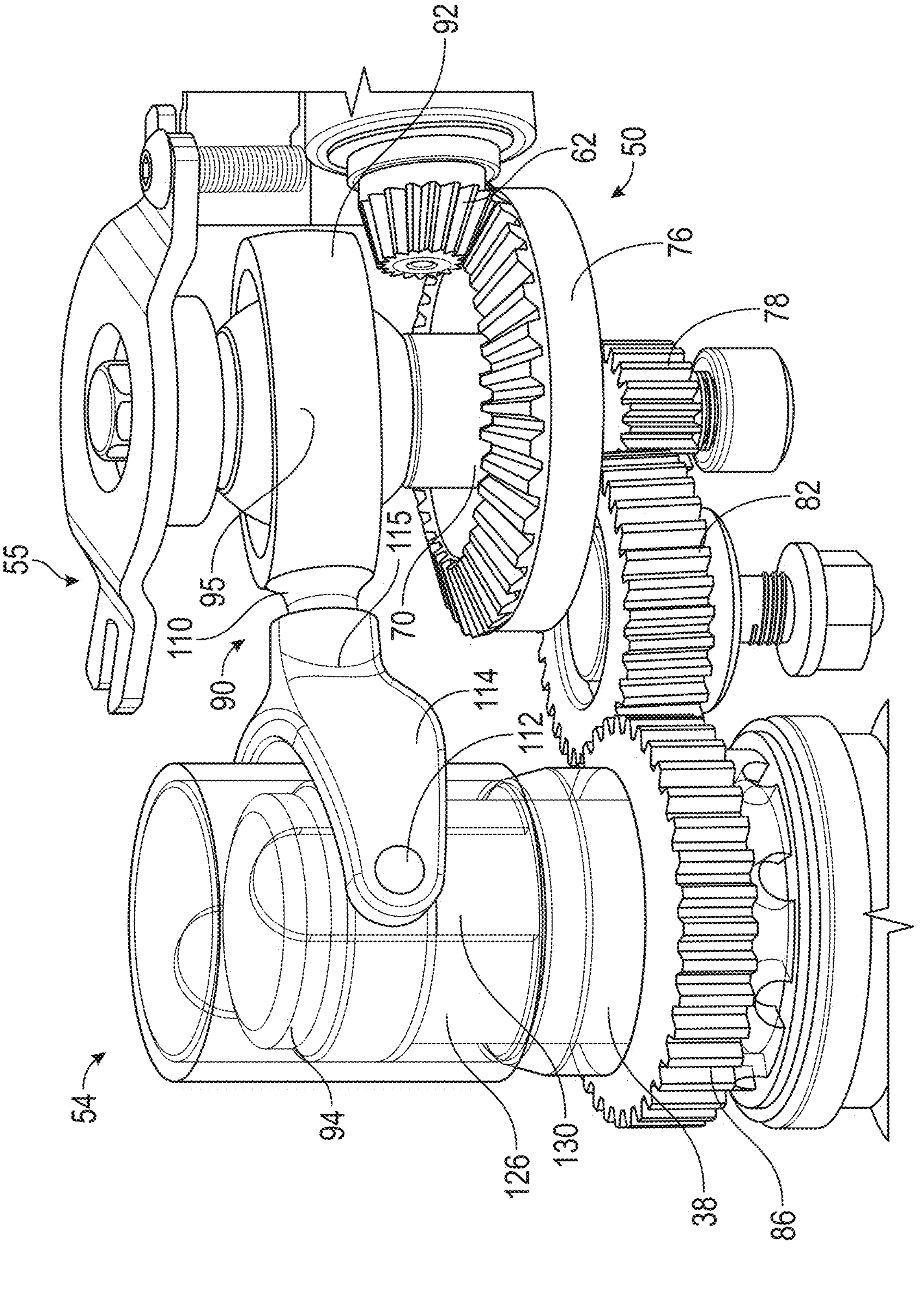
FIG. 5 is a detail view of the impact mechanism of FIG. 4.
Figure 6:
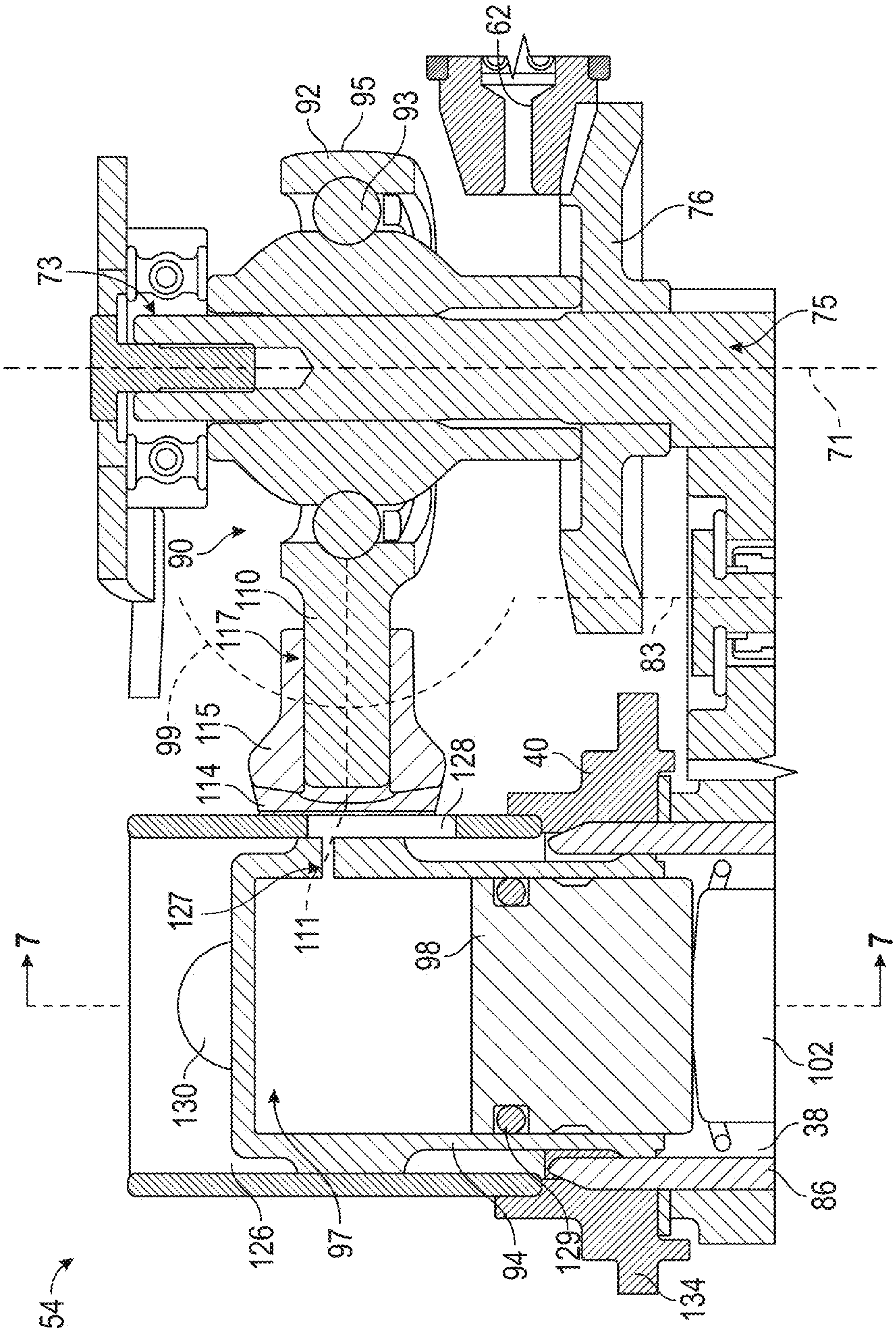
FIG. 6 is a cross-sectional view of the impact mechanism of FIG. 5.

With reference to FIGS. 3A and 3B, the motor 34 includes a motor shaft 58 and a pinion 62 coupled to an end of the motor shaft 58. The motor shaft 58 defines a motor shaft axis 66 that, in some embodiments, is substantially parallel to the handle axis 26 or the first direction 67. The motor shaft axis 66 and the handle axis 26 may form a second angle 37 therebetween. In some embodiments, the second angle 37 between the handle axis 26 and the motor shaft axis 66 is less than about 15 degrees, and more specifically about 10 degrees. In other examples, the second angle 37 is between about 0 to 5 degrees, about 5 to 10 degrees, about 10 to 15 degrees, about 15 to 20 degrees, about 20 to 25 degrees, or any angle greater than 0 degrees and less than 90 degrees. In some examples, the second angle 37 is about 15 degrees. Correspondingly, the actuator 25 can be arranged on the handle 22 so that the actuation direction 41 is substantially perpendicular to the shaft axis 66, for example, to be substantially perpendicular to the spindle axis 48. In other embodiments, the handle 22 may be oriented differently, for example, so that the handle axis 26 is substantially perpendicular with the shaft axis 66 or the first direction 67. Correspondingly, the actuator 25 can be arranged on the handle 22 so that the actuation direction 41 is substantially parallel with the shaft axis 66, for example, to be substantially perpendicular to the spindle axis. In other examples, the motor 34 can be oriented differently, for example, so that the shaft axis 66 is transverse (e.g., substantially perpendicular) to the spindle axis 48. In other examples, alternative orientations of the actuator 25, and, correspondingly, the actuation direction 41, are contemplated.

With continued reference to FIGS. 3A and 3B, the spindle 38 includes a first end 40 and an opposite second end 42 between which a length of the spindle 38 is defined. The spindle axis 48 is defined along the length of the spindle 38 between the first and second ends 40, 42. The spindle 38 is rotatable about the spindle axis 48 when the motor 34 is activated. The spindle axis 48 is oriented at a non-zero angle relative to the motor shaft axis 66 or the first direction 67 to allow for improved ergonomics and impact force transfer when the rotary hammer 10 is being used. In the illustrated example, the spindle axis 48 is transverse to the motor shaft axis 66 or the first direction 67, as may be particularly useful for overhead drilling applications, as well as drilling into other horizontal surfaces, for example, a floor. More specifically, the spindle axis 48 is substantially perpendicular (e.g., to be within about 15-degrees of perpendicular) to the motor axis 26 or the first direction 67.

Figure 8A:
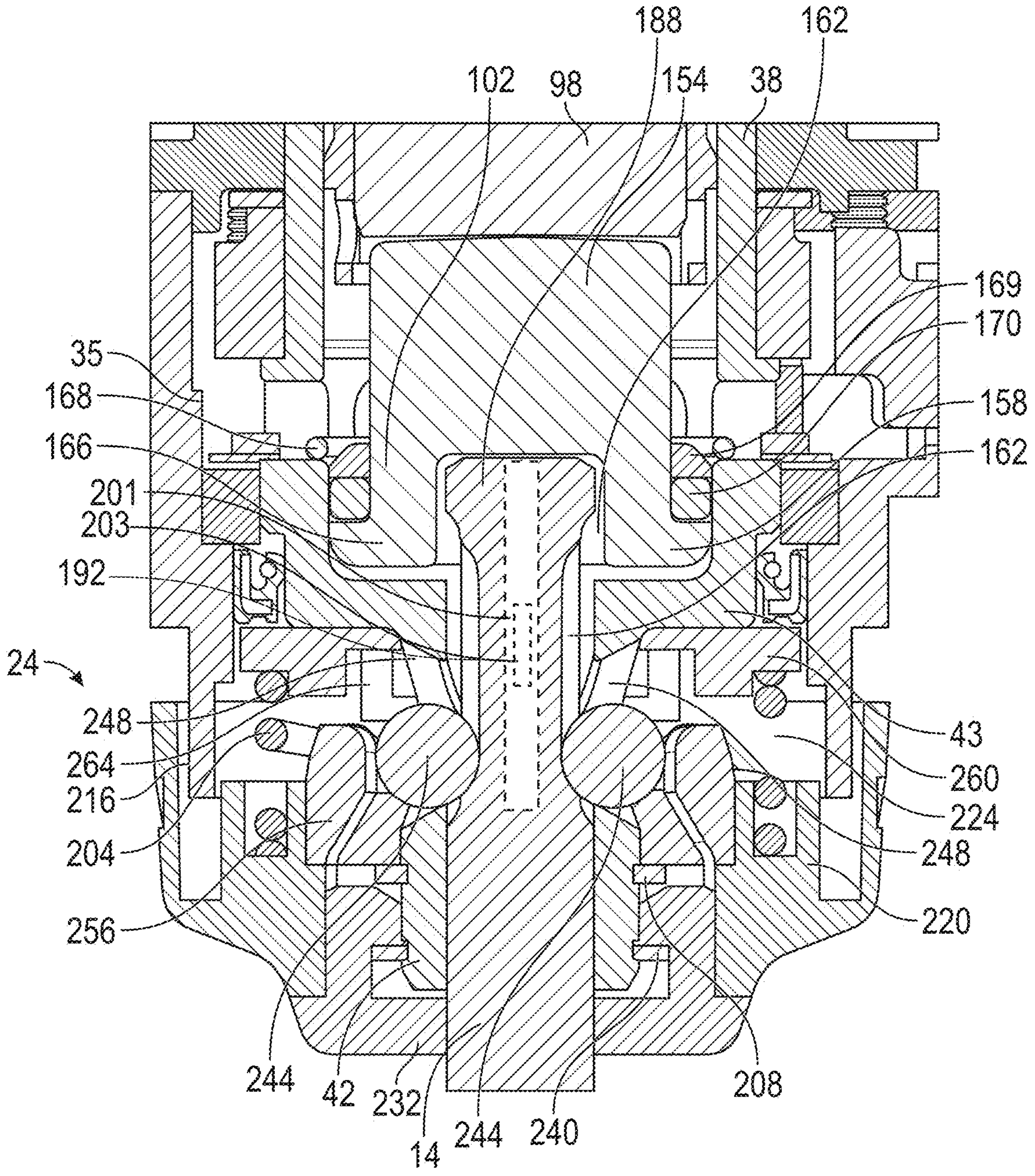
FIG. 8A is a cross-sectional view of an example anvil for use with the rotary hammer of FIG. 1, according to aspects of the disclosure.

To further improve ergonomics, in some embodiments, the spindle axis 48 is oriented transverse to the handle axis 26, as may allow a user to efficiently apply force to the tool bit 14 during a drilling operation. More specifically, the spindle axis 48 can be substantially perpendicular to the handle axis 26. The second end 42 of the spindle 38 includes a tool bit receptacle 44 in which the tool bit 14 is removably received. The chuck 24 is also attached to the second end 42 of the spindle 38 and includes one or more ball detents 244 that are received within respective longitudinal indentations 192 in the tool bit 14 to both transmit torque from the spindle 38 to the tool bit 14 and limit the amount to which the tool bit 14 can translate relative to the receptacle 44 (FIG. 8A). In the illustrated example, a plurality of ball detents 244 are provided in an opposed configuration about the spindle axis 48. Other arrangement of ball detents 244 are also possible.

FIGS. 3A, 3B, 4, and 5 illustrate aspects of the transmission 50 of the rotary hammer 10. The transmission 50 transfers torque from the motor 34 to the spindle 38, causing the spindle 38 to rotate when the motor 34 is activated. The transmission 50 includes an intermediate shaft 70, a bevel gear 76 meshed with the motor pinion 62, and a gear train 72 between the intermediate shaft 70 and the spindle 38. In some cases, the bevel gear 76 can be another type of gear (e.g., a hypoid gear, spur gear, etc.) in accordance with an orientation relative to the motor shaft axis 66. In some embodiments, the intermediate shaft 70 is positioned between the motor shaft 58 and the spindle 38. The intermediate shaft 70 includes a first end 73 and an opposite second end 75 between which a length of the intermediate shaft 70 is defined. A longitudinal axis 71 of the intermediate shaft 70 is extends along the length of the intermediate shaft 70 between the first and second ends 73, 75. The intermediate shaft 70 rotates about the axis 71. The intermediate shaft 70, and therefore the longitudinal axis 71, are substantially parallel to the spindle axis 48 (e.g., to be substantially perpendicular to the first direction or the motor shaft axis 66). In some embodiments, the intermediate shaft 70 and corresponding longitudinal axis 71 may be at a different angle relative to the spindle axis 48.

The bevel gear 76 transfers torque from the motor 34 to the intermediate shaft 70. The bevel gear 76 is meshed with the pinion 62 of the motor shaft 58 such that torque from the motor 34 is transferred to the bevel gear 76. The bevel gear 76 is coupled to the intermediate shaft 70 such the intermediate shaft 70 co-rotates with the bevel gear 76. With continued reference to FIGS. 3A, 3B, 4, and 5, the gear train 72 includes a drive gear 78, an idler gear 82 meshed with the drive gear 78, and a driven gear 86 meshed with the idler gear 82. The drive gear 78 is coupled to the second end 75 of the intermediate shaft 70 and co-rotates with the intermediate shaft 70. In some embodiments, the drive gear 78 is integrally formed with the intermediate shaft 70. The idler gear 82 transfers torque from the drive gear 78 to the driven gear 86, which is coupled for co-rotation with the spindle 38. The driven gear 86 transfers torque from the idler gear 82 to the spindle 38 to cause the spindle 38 to rotate.

FIGS. 3-8A illustrate the impact mechanism 54 of the rotary hammer 10. The impact mechanism 54 is configured to impart repeated axial impacts to the tool bit 14. The impact mechanism can generate impact energy via an oscillation mechanism that converts the rotational motion of the motor into reciprocating linear motion. The impact mechanism 54 (e.g., the oscillation mechanism) can be driven by the motor 34. In some cases, the impact mechanism 54 can be driven by (e.g., receive an input from) the transmission 50, or it can be driven by a separate dive system. The impact mechanism 54 can include an oscillating mechanism that is configured to convert rotational motion of the motor 34 into reciprocating linear motion that is used to deliver repeated (axial) impacts to the tool bit 14. The oscillation mechanism can be configured as, for example, a cam-follower, crank-slider, swashplate, or another type of system configured to generate reciprocating linear movement from a rotational input.

For example, the impact mechanism 54 includes an oscillation mechanism 55 configured as a wobble assembly 90, a piston 94, a striker 98, and an anvil 102. The wobble assembly 90 drives the piston 94 to reciprocate in response to rotation of the intermediate shaft 70. The wobble assembly 90 includes a wobble bearing 92 (e.g., a swing bearing) coupled for co-rotation with the first end 73 of the intermediate shaft 70 (e.g., to be driven by the transmission 50). The wobble bearing 92 includes a spherical inner race 93 with a circumferential channel that is tilted at a non-zero angle relative an axis of rotation of the race (e.g., the axis 71 of the intermediate shaft 70). As illustrated, the inner race 93 can be formed with the intermediate shaft 70. An outer race 95 is formed as an annular race and includes pin 110 that extends radially outward from the inner race 93. As the inner race 93 rotated (e.g., by the intermediate shaft 70), it causes the outer race 95 to wobble so that the pin 110 both rotates about an axis 111 of the pin 110 and swivels (e.g., pivoting) along an arc 99, which is concentric to the inner race 93, in a reciprocating manner in response to rotation of the wobble bearing 92. The arc 99 can be planar so that it lies in a plane defined by the spindle axis 48 and at least one of the intermediate shaft axis 71, an axis 83 of the idler gear 82, the first direction 67, the motor shaft axis 66, the handle axis 26, and the actuation direction 41 of the actuator 25.

Wobbling movement of the pin 110 is transmitted to reciprocating motion to the piston 94 to drive the piston 94 to reciprocate. For example, the pin 110 is movably coupled to a yoke 115 that drives the linear reciprocating motion of the piston 94. More specifically, the arcuate motion of the pin 110 causes linear motion of the yoke 115. Correspondingly, the yoke 115 includes an opening 117 that moveably receives the pin 110. As the pin 110 wobbles, the pin 110 can rotate about the pin axis 111 within the opening 117 and can slide along the direction the pin axis 111 within the opening 117 to accommodate for the radial component of the arcuate movement of the pin 110. However, the pin 110 is constrained in the opening 117 such that the arcuate movement of the pin 110 results in yoke 115 moving linearly along the spindle axis 48. As the yoke 115 moves linearly, the yoke 115 can also pivot about a connection with the piston 94 to account for the arcuate movement of the pin 110.

With reference to FIGS. 4, 5, 6, and 7, the yoke 115 includes two spaced arms 114 that define a gap therebetween, and the piston 94 is located within the gap. The distal ends of the spaced arms 114 are coupled to an outer periphery of the piston 94 via respective pivot joints 112. In some embodiments, the pivot joints are configured as pins 112. The pins 112 are coupled to the cylindrical outer periphery of the piston 94. More specifically, the pins 112 are press-fit to the cylindrical outer periphery of the piston 94. In some embodiments, washers 116 (FIG. 7) may be positioned between the respective yoke arms 114 and the side surface of the piston 94. The washers 116 may be curved to compliment the cylindrical outer periphery of the piston 94. In some embodiments, the pins 112 may be press fit into the yoke 115.

Figure 7:
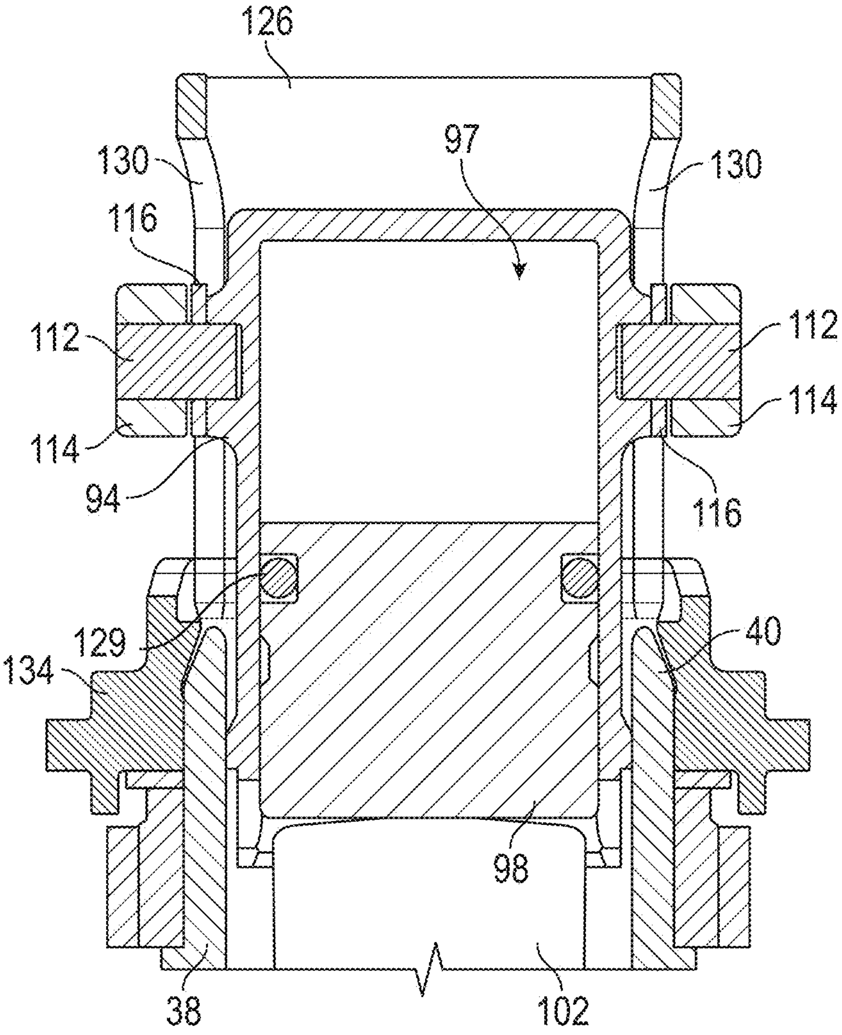
FIG. 7 is another cross-sectional view of the impact mechanism of FIG. 6 through section 7-7 in FIG. 6.

With continued reference to FIG. 7, the piston 94 is partially received in the spindle 38 and partially received in a sleeve 126, and as such the piston 94 reciprocates within the spindle 38 and the sleeve 126. The sleeve 126 is adjacent the first end 40 of the spindle 38 and positioned coaxial with the spindle 38. Unlike the spindle 38 that is driven to rotate, the sleeve 126 is fixed to the upper gear case 33 against translation and rotation.

The sleeve 126 includes one or more slots 130 to allow the yoke 115 to pivotally couple to the piston 94. In this case, the slots 130 are configured as a set of parallel slots 130 (see also FIGS. 5 and 6) that expose the cylindrical outer periphery of the piston 94. As shown in FIG. 7, the spaced arms of the yoke 115 and the pins 112 extend through the slots 130 to attach to the piston 94. In some embodiments, the sleeve 126 may further include other openings, for example, a slot 128 (FIG. 6) to expose and cover a mass balance orifice 127 of the piston 94 as the piston 94 reciprocates. In some examples, the mass balance orifice 127 allows for “make-up” air to get back into the piston cavity if air is lost across an O-ring (e.g., an O-ring 129) during reciprocation of the piston 94. That is, if a seal between the striker 98 and the piston 94 breaks and allows air to escape, replacement air can enter through the mass balance orifice 127 when it is aligned with a slot 128 in the sleeve 126. Further, in some examples, the mass balance orifice 127 will only allow air flow when the mass balance orifice 127 is in the slot 128 and the size of the mass balance orifice 127 can be selected to influence the dynamic pressure of the system (e.g., pressure in an interior chamber 97). Further still, in some examples, the mass-balance orifice 127 can be open and closed as the piston 94 slides up and down with the sleeve 126 along a direction that may be substantially parallel with the spindle axis 48. In some examples, the O-ring 129 may also be manipulated to influence pressure dynamic in an air column (e.g., an interior chamber, piston cavity, etc.).

In some embodiments, such as the example configuration of FIG. 3B, a sleeve and collar may be combined to a single component. For example, the sleeve 126 and collar 134 of FIG. 3A may be combined into a single component, as shown in FIG. 3B.

With reference to FIG. 7, a collar 134 aligns the sleeve 126 to the spindle 38. An end of the sleeve 126 is press-fit into the collar 134, and the first end 40 of the spindle 38 is received in the collar 134 for relative rotation therewith. In this manner, the collar 134 is also a bushing for the spindle 38. In some embodiments, the collar 134 additionally couples the upper gear case 33 to the lower gear case 35 (FIG. 3A).

With continued reference to FIGS. 3A, 3B, 6, and 7, the piston 94 is hollow and defines an interior chamber 97 in which the striker 98 is movably received. An air spring is developed between the piston 94 and the striker 98. When the piston 94 reciprocates within the spindle 38, the piston 94 and the striker 98 can move relative to one another. For example, as the piston 94 is moved toward the anvil 102, the air pocket is compressed, and as the piston 94 is moved away from the anvil 102, the air pocket is expanded. This expansion and retraction of the air pocket results in pressure changes in the air pocket that causes reciprocation of the striker 98.

With additional reference to FIG. 8A, the anvil 102 is configured to impart axial impacts onto the tool bit 14 in response to the reciprocation of the piston 94 and the striker 98. The anvil 102 is received in the spindle 38 and includes a first end 154 and a second end 158 opposite the first end 154. The first end 154 is configured to engage with the striker 98 to receive the impact from the striker 98. The second end 158 of the anvil 102 includes a flange 166 and a cavity 162. A connector 188 (e.g., a connector end) of the tool bit 14 is received in the cavity 162. The flange 166 is captured between an interior shoulder 43 of the spindle 38 and a retaining clip 168 (e.g., a retainer) that is secured to the spindle 38, thereby limiting the axial movement of the anvil 102. A bumper ring 170 (e.g., a rubber bumper, see FIG. 8A) may be positioned between the flange 166 and the retaining clip 168 to absorb a portion of the axial impact between the anvil 102 and the retaining clip 168 as it reciprocates. In some embodiments, the bumper ring 170 can dampen impact that may occur from the tool bit 14 rebounding off of a drill surface. Additionally, in some embodiments, the bumper ring 170 may be used as a seal. Further, a washer 169 is located between the bumper ring 170 and the retaining ring 168.

In operation, when the tool bit 14 is attached to the chuck and depressed against a workpiece, the tool bit 14 pushes the striker 98 (via the anvil 102) toward the piston 94 to attain an "impact" position of the striker. In some examples the "impact" position of the striker 98 can be defined by the striker 98 being pushed passed a series of optional orifices that would allow the free exchange of air from the interior chamber 97 (e.g., for parking). In some examples, the series of orifices is not included in the rotary hammer, and, thus, the impacting and non-impacting positions of the strike can be similar, and in some examples, substantially identical. Further, in some examples, parking could be added to the rotary hammer to improve and some aspects of user experience. During operation of the rotary hammer 10, the piston 94 reciprocates within the spindle 38 to draw the striker 98 away from the anvil 102 and then accelerate it towards the anvil 102 for impact.

Figure 8B:
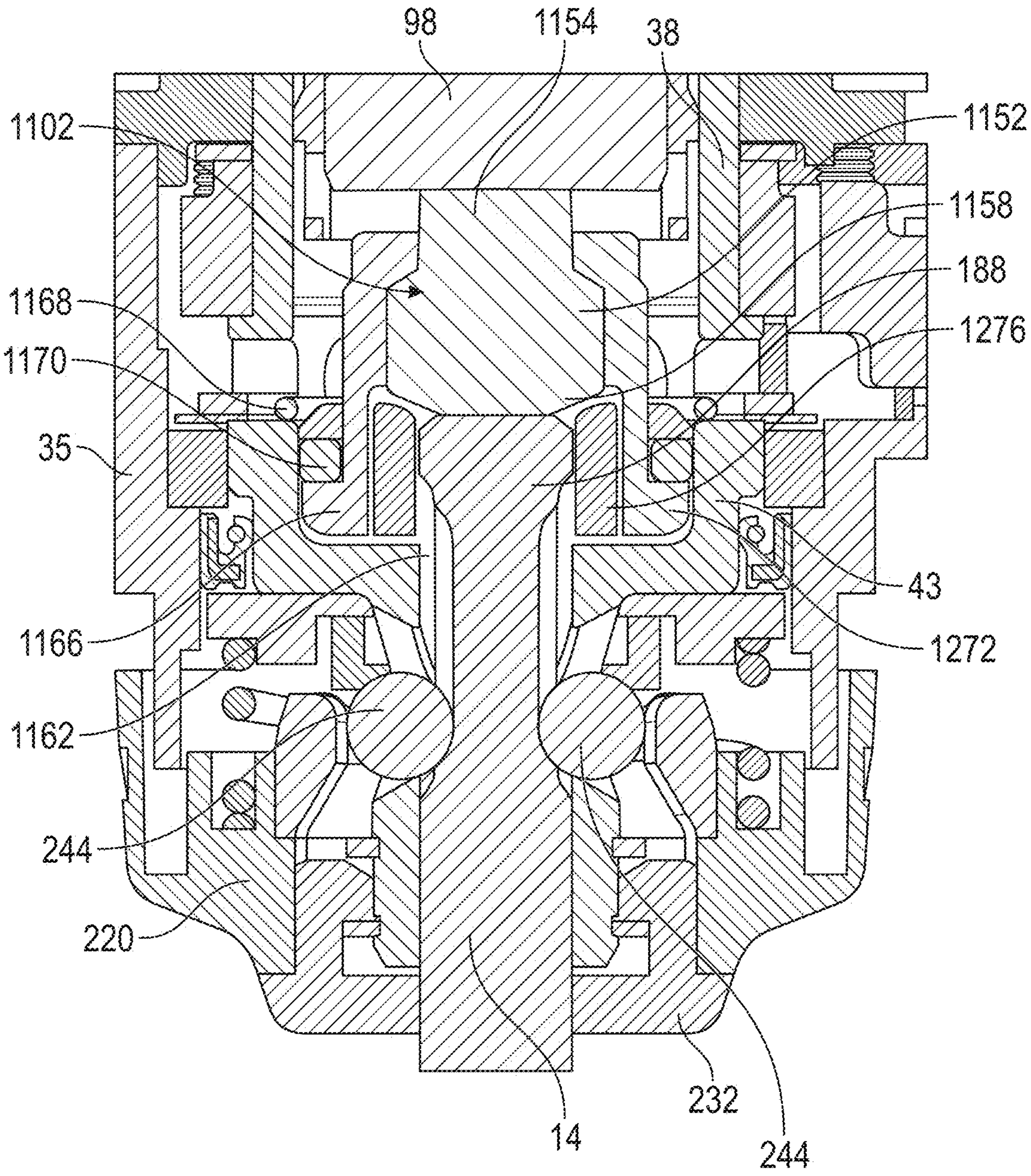
FIG. 8B is a cross-sectional view of another example anvil for use with the rotary hammer of FIG. 1, according to aspects of the disclosure.

FIG. 8B illustrates another embodiment of an anvil 1102 for use in the rotary hammer 10, which is configured as an anvil assembly. Many features of the anvil 1102 are similar to those discussed above with regard to the first embodiment of the anvil 102. As such, many of these features will not be discussed again below because the above discussion of the features of the anvil 102 applies to the similar features of the anvil 1102. Features similar to those discussed above will be labeled with a reference number that is a value of one thousand higher than the corresponding feature discussed above.

The anvil 1102 is disposed in the spindle 38 and is configured to impart an impact to the tool bit 14. The anvil 1102 includes a body 1152 (e.g., an anvil body) having a first end 1154 and a second end 1158, which is configured to transmit an impact from the striker 98 to the tool bit 14. The body 1152 of the anvil 1102, which makes contact with the tool bit 14, is comparatively smaller than the anvil 102. The anvil 1102 further includes an anvil sleeve 1272 coupled to the body 1152. More specifically, the anvil sleeve 1272 is coupled to the body 1152 between the first end 1154 and the second end 1158. In the anvil sleeve 1272 can be fixedly or moveably coupled to the body 1152. In some embodiments, the anvil sleeve 1272 holds the anvil body 1152 radially in place relative to the spindle 14. Additionally, in some embodiments, the anvil sleeve 1272 can also limit how far the anvil body 1152 can be moved axially upward (e.g., how far the anvil 1102 can be moved along a direction parallel to the spindle axis 48 and in a direction away from the spindle 14). The anvil sleeve 1272 surrounds (e.g., covers) the second end 1158 of the body 1152 and the first end 1154 of the body 1152 extends through an opening in the anvil sleeve 1272 to contact with the striker 98. The anvil sleeve 1272 includes a flange 1166 that extends past the body 1152 of the anvil 1102. The flange 1166 forms a cavity 1162 in which an end of the tool bit 14 is received. The second end 1158 extends into the cavity 1162 to contact with the tool bit 14. The flange 1166 is captured between an interior shoulder 43 of the spindle 38 and a retaining clip 1168 secured to the spindle 38, thereby limiting the axial movement of the anvil 1102. A bumper ring 1170 may be positioned between the flange 1166 and the retaining clip 1168 to absorb a portion of the axial impact of the anvil 1102 as it reciprocates.

The anvil 1102 further includes a brake ring 1276 positioned between the cavity 1162 and the flange 1166. The brake ring 1276 limits the axial movement of the anvil 1102. More specifically, the brake ring 1276 prevents the anvil 1102 from moving toward the tool bit 14 and an annular wall 220 of a collar 200 and out of the spindle 38. In some embodiments, the brake ring 1276 axially retains the anvil 1102 in a downward direction (e.g., retains the anvil 1102 in a direction parallel to the spindle axis 48 and in the direction toward the spindle 14). In other embodiments, the brake ring 1276 can interrupt the energy transfer from the anvil 1102 when the tool bit 14 is disengaged, which can advantageously increase the durability (e.g., longevity) of the rotary hammer 10.

Figure 8C:
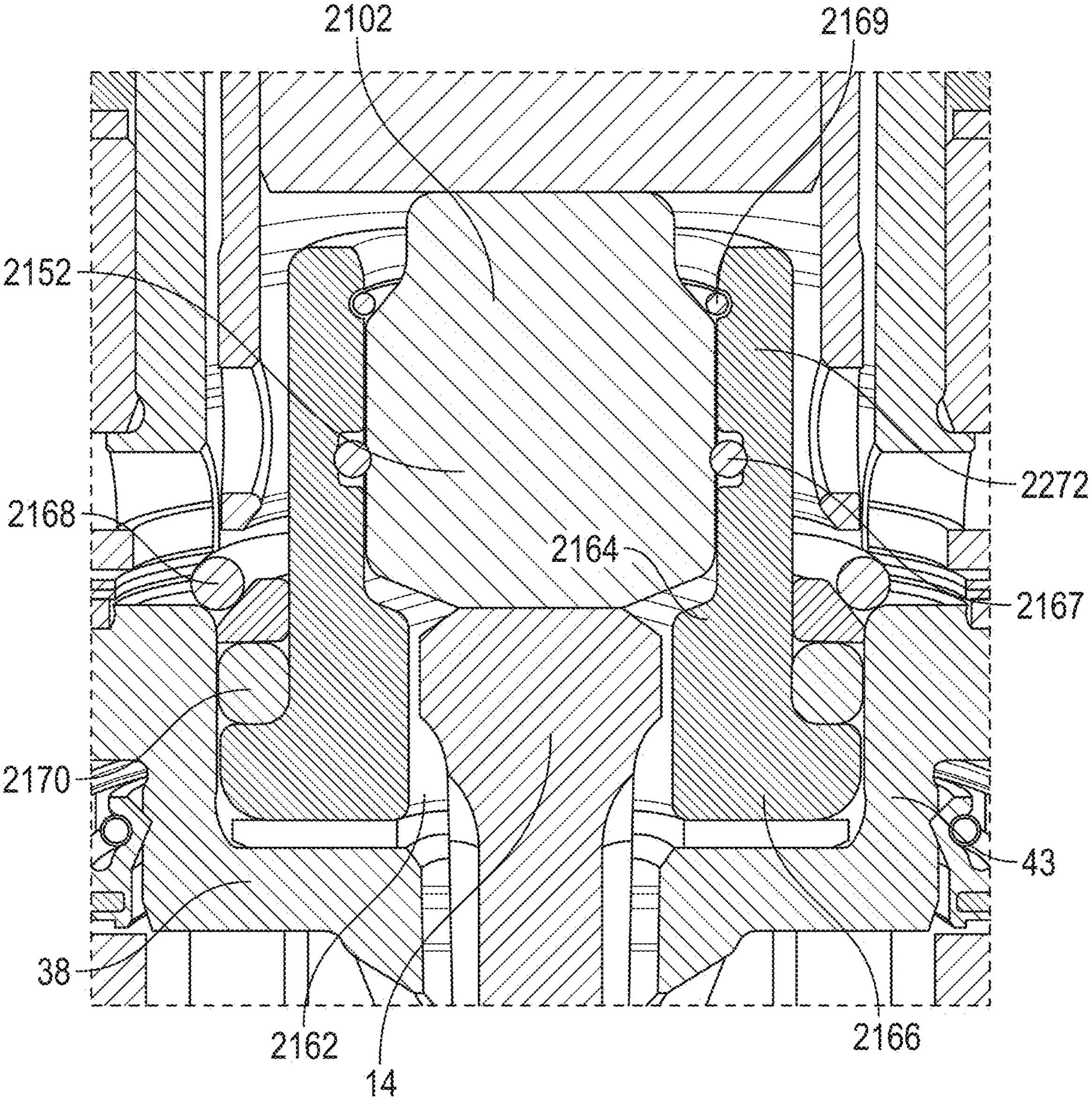
FIG. 8C is a cross-sectional view of yet another example anvil for use with the rotary hammer of FIG. 1, according to aspects of the disclosure.

FIG. 8C illustrates another embodiment of an anvil 2102 for use in the rotary hammer 10. Many features of the anvil 2102 are similar to those discussed above with regard to the second embodiment of the anvil 1102. As such, many of these features will not be discussed again below because the above discussion of the features of the anvil 102 applies to the similar features of the anvil 2102. Features similar to those discussed above will be labeled with a reference number that is a value of one thousand higher than the corresponding feature discussed above.

The anvil 2102 is disposed in the spindle 38 and is configured to impart an impact to the tool bit 14. The anvil 2102 includes a body 2152 and an anvil sleeve 2272 that is moveably coupled to the body 2152. In some examples, the anvil sleeve 2272 is fixedly coupled to the body 2152. The anvil sleeve 2272 includes an O-ring 2167 situated on the outer periphery of the anvil body 2152. A retaining clip 2169 secures the anvil 2102 to the anvil sleeve 2272. The retaining clip 2169 limits the extent of axial movement of the anvil 2102 away from the anvil 2102 within the anvil sleeve 2272. The anvil sleeve 2272 surrounds (e.g., covers) an end of the body 2152. The anvil sleeve 2272 includes a flange 2166 that extends past the body 2152 of the anvil 2102. The flange 2166 forms a cavity 2162 in which an end of the tool bit 14 is received. The cavity 2162 defines an interior shoulder 2164 (e.g., an integrated brake ring) of the cavity 2162. The interior shoulder 2164 of the cavity 2162 decreases the diameter of the cavity 2162 and limits the axial movement of the anvil 2102 toward the tool bit 14 and a collar 200 without the need for a separate brake ring. The region of decreased diameter in the cavity 2162 limits the axial movement of the anvil 2102 toward the collar 200 and tool bit 14 without the need for a separate brake ring (e.g., brake ring 1276). The flange 2166 is captured between an interior shoulder 43 of the spindle 38 and a retaining clip 2168 is secured to the spindle 38, thereby limiting the axial movement of the anvil 2102. A first bumper ring 2170 may be positioned between the flange 2166 and the retaining clip 2168 to absorb a portion of the axial impact of the anvil 2102 as it reciprocates in a direction to contact the retaining ring 1268. The anvil 2102 further includes a second bumper 2276 coupled to the opposite side of the flange 2166. The second bumper ring 2276 absorbs a portion of the axial impacts of the anvil 2102 as it reciprocates toward the collar 200 to contact the spindle 38. In some embodiments, the anvil 2102 may not include a second bumper.

With reference to FIGS. 8A-13, the rotary hammer 10 may include a chuck 24 coupled for co-rotation with the spindle 38 to facilitate removal and replacement of different tool bits 14. In some cases, the chuck 24 can be a toolless chuck that allows a user to remove or insert the tool bit 14 without the need for a chuck key. For example, the chuck 24 includes the collar 200 that is axially displaceable along the spindle 38 (e.g., along the spindle axis 48) of the rotary hammer 10. The collar 200 can move between a first or forward position (e.g., a locked configuration, see FIGS. 11 and 12) that secures the tool bit 14 to the spindle 38 and a second or rearward position (e.g., an unlocked configuration, see FIG. 13) that allows the tool bit 14 to be removed from the spindle 38. In the first or forward position, the collar 200 is in a locked configuration such that the collar 200 is in contact with a flange 233 (e.g., a locking surface) of a cap 232. Alternatively, in the first or forward position, a first ring 256 coupled to the collar 200 and is in contact with a first retaining ring 208. The contact between the first ring 256 and the first retaining ring 208 limits the downward motion of the collar 200 (e.g., motion of the collar 200 in a direction that is parallel to the spindle axis 48 and in a direction away from the anvil 102, 1102). Further, in some embodiments, the cap 232 can be made of rubber and deform until the first ring 256 contacts the first retaining ring 208.

In the second or rearward position, the collar 200 is spaced away from the flange 233 of the cap 232, defining a gap 235. Put differently, the collar 200 can be moved away from the retaining ring 240 and toward the retaining ring 208 (e.g., toward the housing 18). The retaining rings 240, 208 retain the cap 232, and thereby the collar 200. In other examples, a cap may not be included and at least one of the retaining rings 240, 208 can retain the collar 200. As described in greater detail below, movement of the collar 200 allows ball detents 244 to selectively engage the tool bit 14 for securing the tool bit 14 to the spindle 38.

Figure 9A:
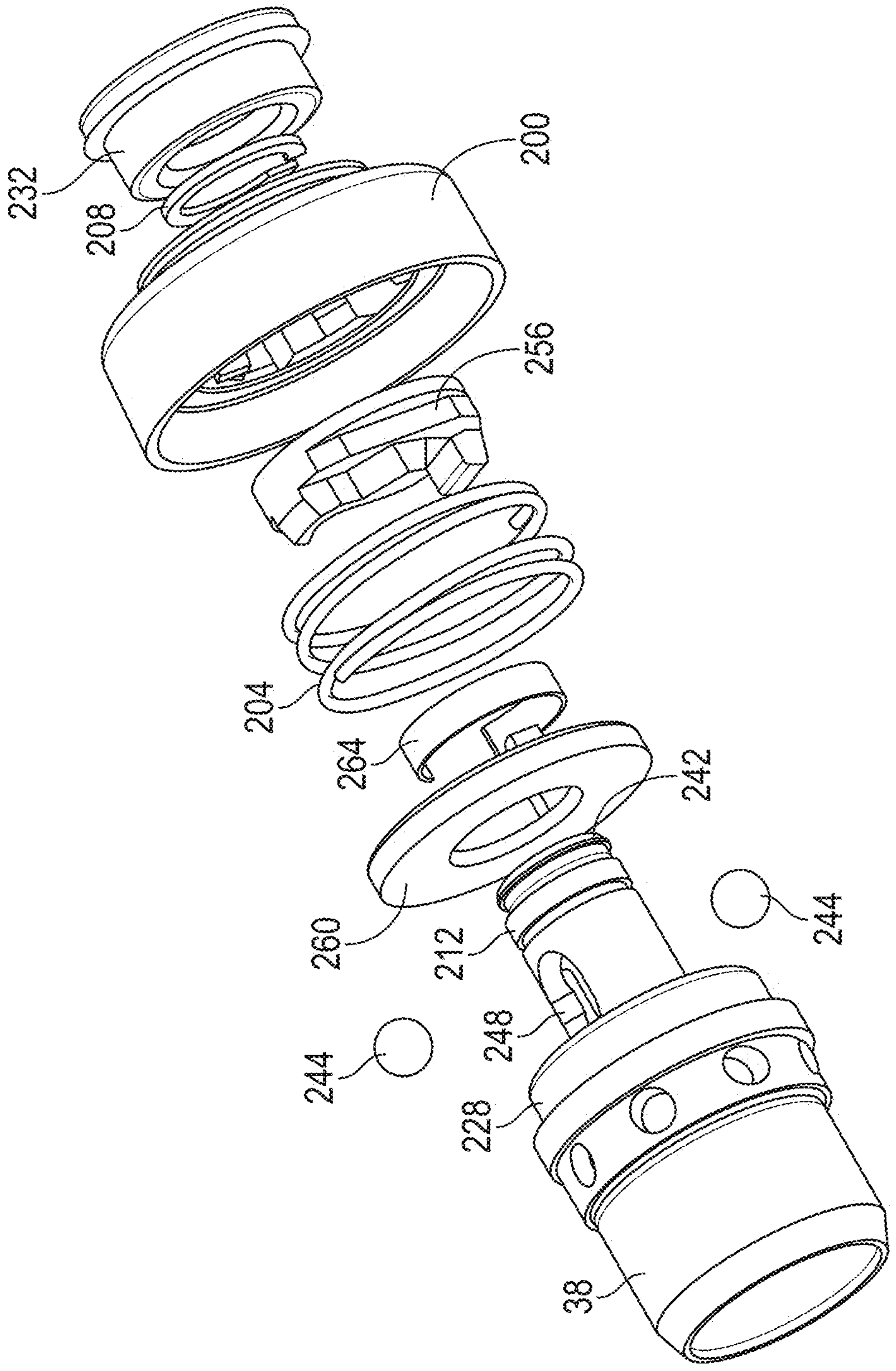
FIG. 9A is an exploded rear perspective view of the chuck of FIG. 8A.
Figure 9B:
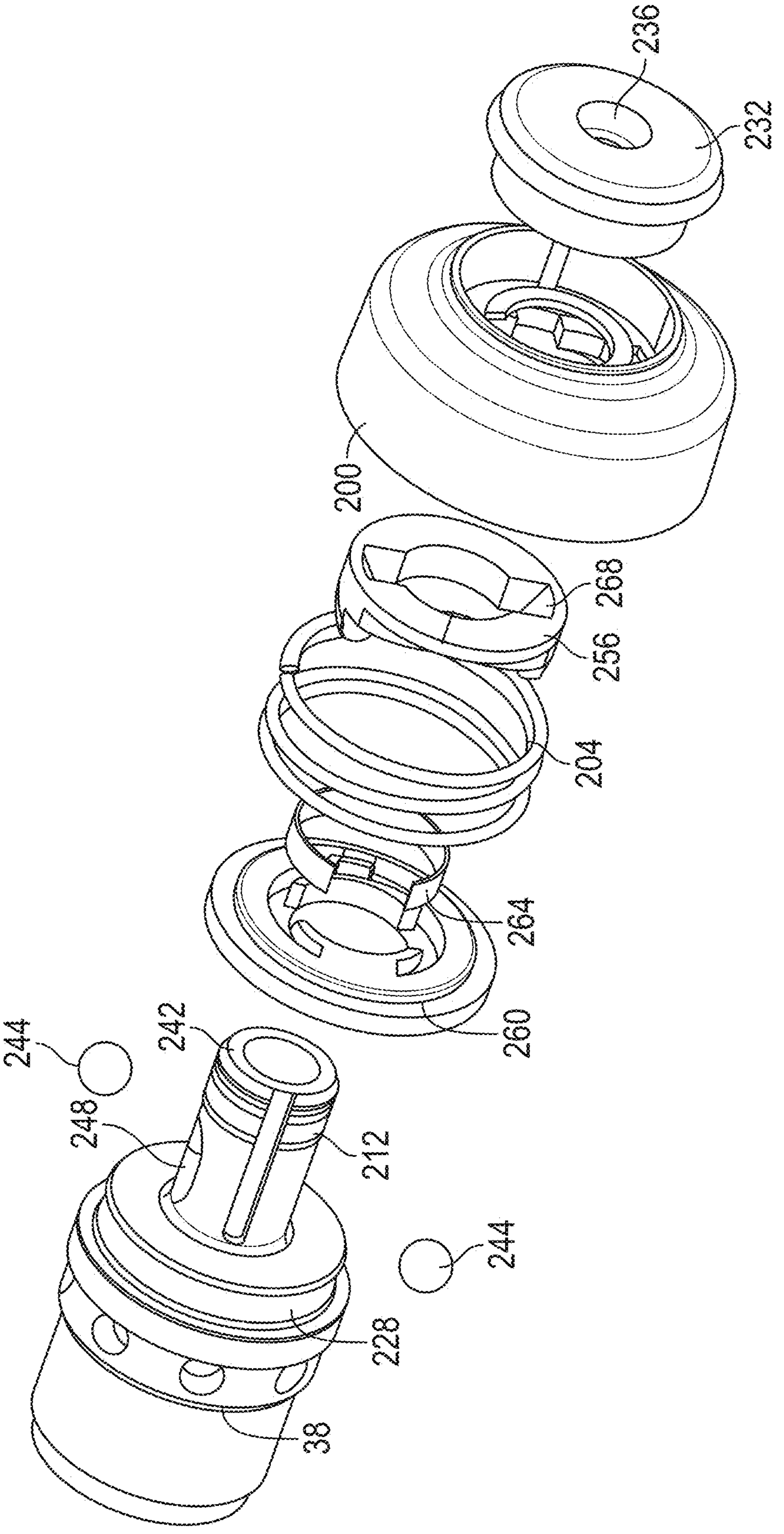
FIG. 9B is an exploded front perspective view of the chuck of FIG. 8A.
Figure 10A:
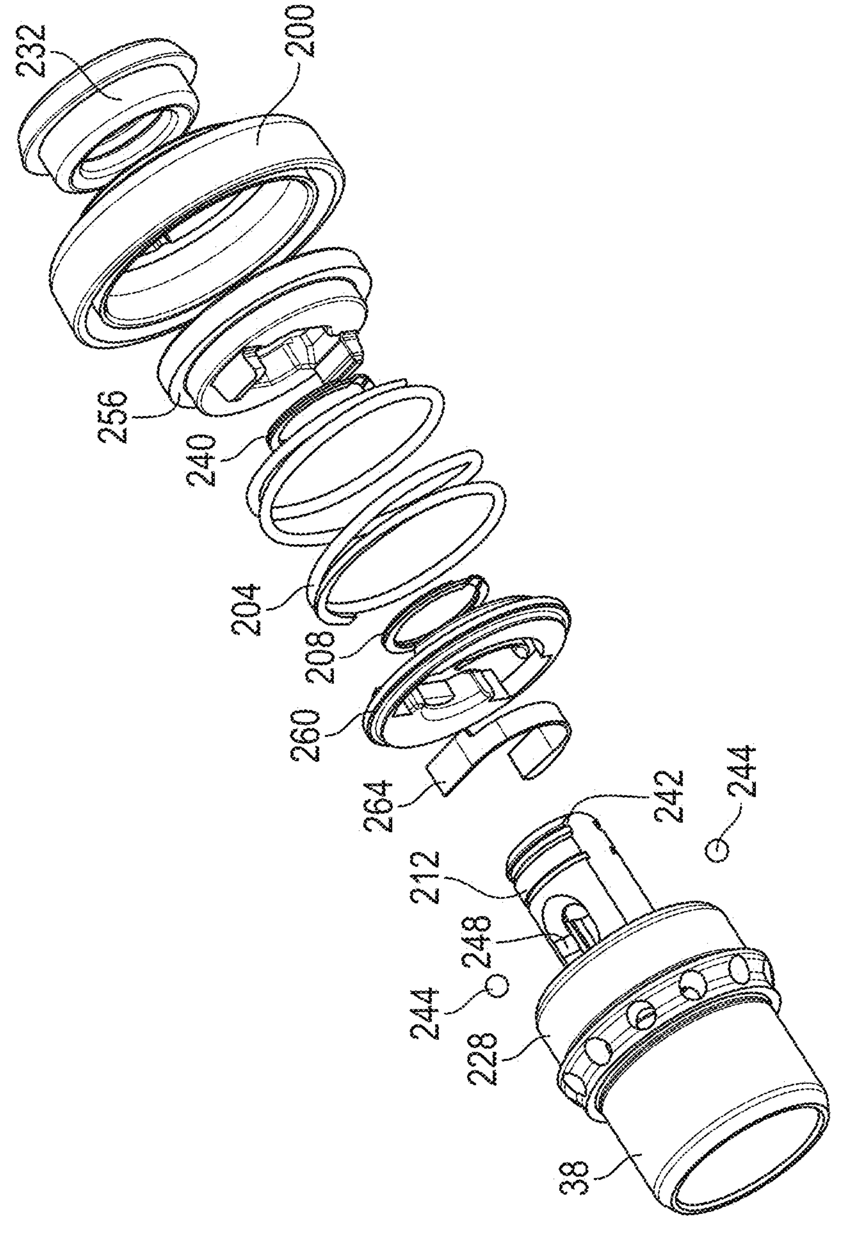
FIG. 10A is an exploded rear perspective view of another example chuck for use with the rotary hammer of FIG. 1, according to some aspects of the disclosure.
Figure 10B:
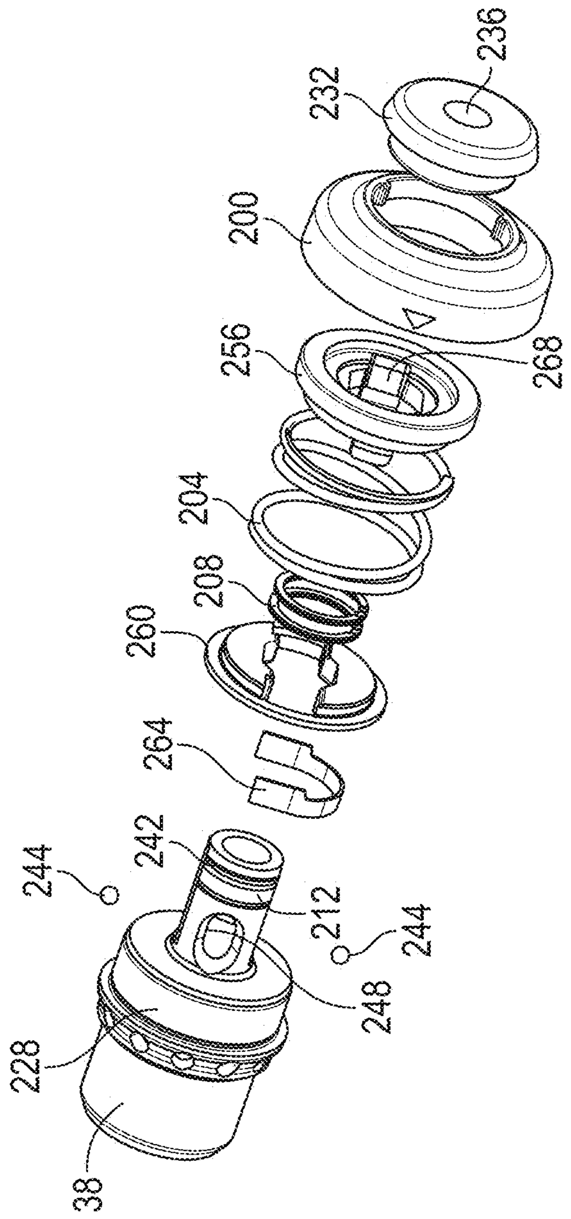
FIG. 10B is an exploded front perspective view of the chuck of FIG. 10A.

The chuck 24 further includes a resilient member 204 (e.g., a coil spring, a leaf spring, an elastomeric bushing, etc.) that biases the collar 200 into the first position. Accordingly, moving the collar 200 toward the second position moves the collar 200 against the bias of the resilient member 204. The resilient member 204 positioned in a pocket 224 defined by the annular wall 220 of the collar 200. The collar 200 is prevented from moving beyond the first position by the first retaining ring 208 (e.g., a split ring, C-ring, snap ring, etc.) that is received within a first retaining groove 212 of the spindle 38 (FIG. 9). The collar 200 is prevented from moving beyond the second position by an annular projection 216 extending from the housing 18 or the lower gear case 35 of the rotary hammer 10.

The rotary hammer 10 further includes the cap 232 that is located on the second end 42 of the spindle 38. The cap 232 includes a hole 236 through which the tool bit 14 extends when the tool bit 14 is fully inserted within the spindle 38. In the illustrated embodiment, the cap 232 is made of rubber. Alternatively, the cap 232 may be made of any other suitable material. The cap 232 is secured to the spindle 38 by a second retaining ring 240 (FIG. 8A), such as a split ring or C-ring, received within a second retaining groove 242 (FIG. 9) of the spindle 38. Because the collar 200 is retained on the spindle 38 by the first retaining ring 208, the chuck 24 is still functional if the cap 232 is removed. In some examples, when the cap 232 is removed, the rotary hammer 10 may advantageously drill a deeper hole. In some examples, when the cap 232 is on the rotary hammer 10, the cap 232 advantageously helps prevent dust from entering into the chuck area (e.g., chuck 24) of the tool. This helps extend the life of these components.

With reference to FIGS. 8A, 9A-11, the ball detents 244 are maintained within a plurality of slots 248 formed in the spindle 38. The slots 248 extend between an exterior of the spindle 38 and the tool bit receptacle 44 (FIG. 11) in which the tool bit 14 is inserted. When the tool bit 14 is inserted into the bit receptacle 44, the ball detents 244 are at least partially received in the indentations 192 formed in the connector 188 of the tool bit 14 (i.e., a locking position; FIG. 12) to define the extent to which the tool bit 14 may reciprocate within the spindle 38. The tool bit 14 may also include a pair of opposed, axially extending keyways 201 that slidably receive corresponding keys 203 located in the tool bit receptacle 44 of the spindle 38 (shown schematically in FIG. 8A). The engagement between the keys and the keyways provides the primary torque transfer means between the tool bit 14 and the spindle 38. The keys 203 and keyways 201 are offset from the ball detents 244, slots 248, and indentations 192 by an angle of about 90 degrees.

The slots 248 in the spindle 38 define an included slot angle between about 30 degrees and about 90 degrees. In some embodiments, the slot angle can be about 60 degrees. This relatively steep angle allows the engagement between the ball detents 244 and the indentations 192 in the tool bit 14 to provide a secondary torque transfer means between the tool bit 14 and the spindle 38. As such, if the keys and/or keyways begin to wear, torque may still be reliably transmitted to the tool bit 14 by the ball detents 244.

Figure 11:
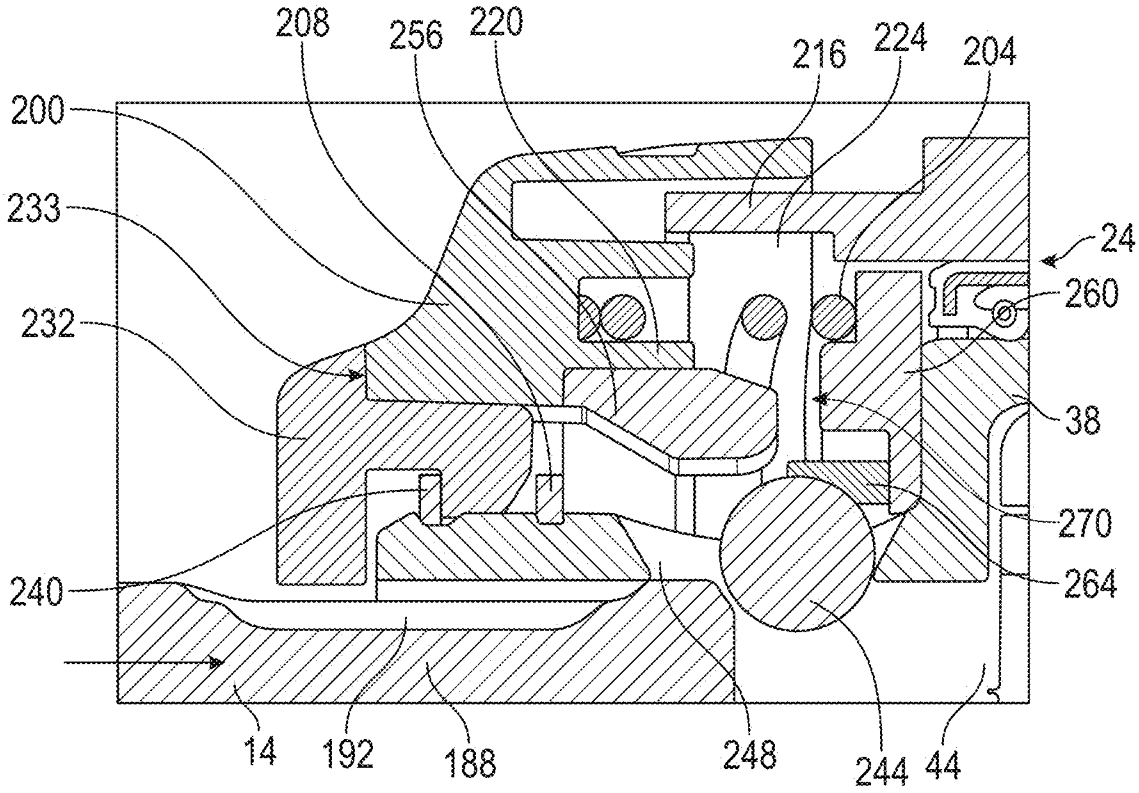
FIG. 11 is a cross-sectional view of the chuck of FIG. 8A, illustrating a tool bit partially inserted within a spindle of the rotary hammer.
Figure 12:
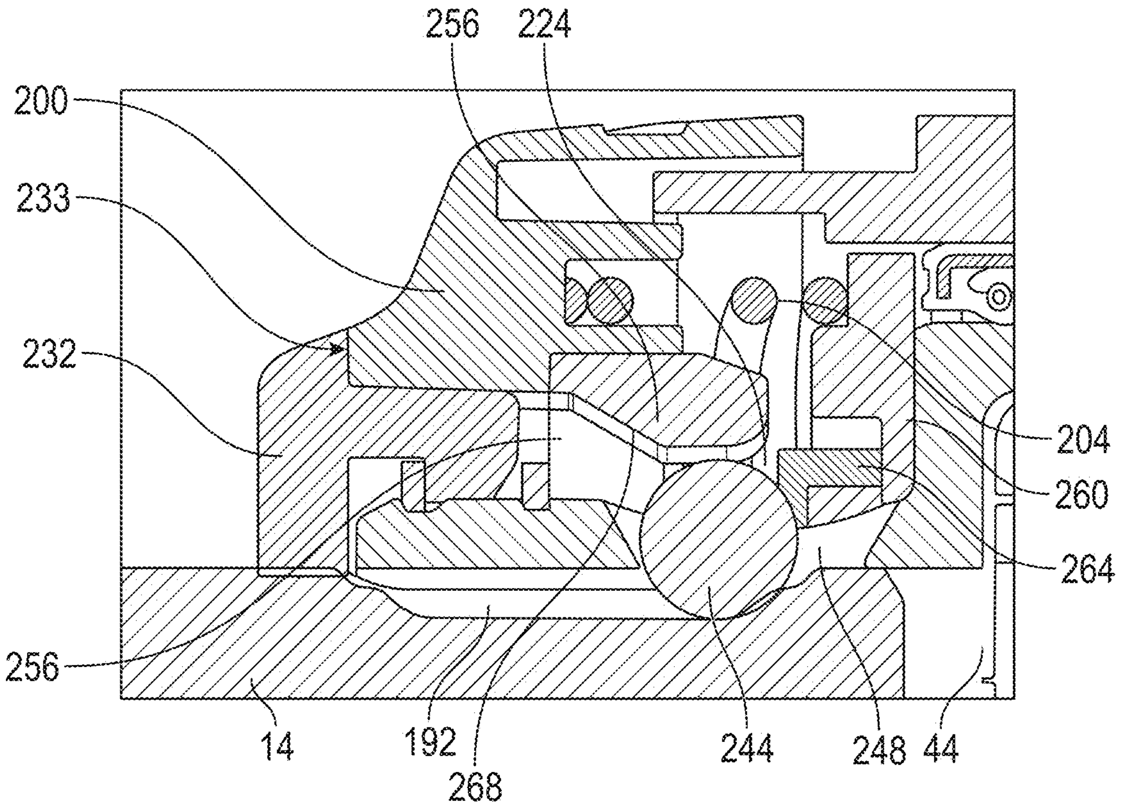
FIG. 12 is a cross-sectional view of the chuck of FIG. 8A, illustrating the tool bit fully inserted within the spindle and the chuck in a locked state.
Figure 13:
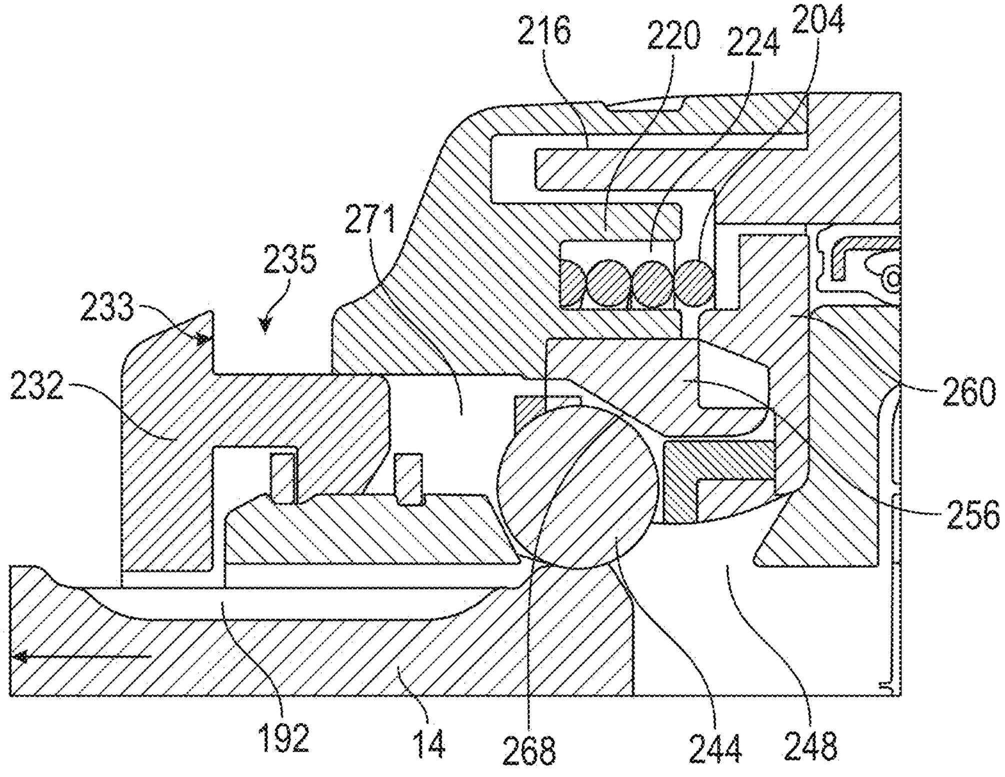
FIG. 13 is a cross-sectional view of the chuck of FIG. 8A, illustrating the chuck being moved to a release state to permit removal of the tool bit from the spindle.

With reference to FIGS. 11-13, the chuck 24 further includes the first ring 256 coupled to the collar 200. Here, the first ring 256 is fixed within the pocket 224 of the collar 200. In the illustrated embodiment, the first ring 256 is insert molded with the collar 200. In some embodiments, the first ring 256 may be fixed to the collar 200 by any other suitable method. The first ring 256 is positioned radially outward of the ball detents 244 when in the locked position (FIG. 12), such that an inner surface 268 of the first ring 256 prevents the ball detents 244 from being displaced out of the indentations 192 against forces to remove the tool bit 14 from the spindle 38 (e.g., intentionally by a user, or due to gravity, or another external force). When the ball detents 244 are placed in the indentations 192, the ball detents 244 engages with the locking collar 256 and face 268, which prevent the ball detents 244 from moving radially outward (e.g., radially outward from the spindle axis 48). Thus, when the ball detents 244 are placed in the indentations 192, the ball detents 244 cannot move radially outward, and the tool bit 14 cannot be removed.

With continued reference to FIGS. 11-13, the chuck 24 further includes a second ring 260 that is configured to couple to the spindle 38, for example, to be positioned on a shoulder 228 (FIG. 9) of the spindle 38. In the illustrated embodiment, the second ring 260 is slip-fitted with the spindle 38. The second ring 260 is configured to rotate with the spindle 38 and can, for example, include a keying feature that locks the second ring 260 in rotation with the spindle 38. In some embodiments, the second ring 260 may be coupled to the spindle 38 by any other situatable method. The second ring 260 supports a resilient member 264 that is configured to bias the ball detents 244 radially inward relative to the spindle axis 48. The resilient member 264 is a flexible ring that can resiliently flex outwardly (e.g., radially outward from the spindle axis). In the illustrated embodiment, the resilient member 264 (e.g., a sleeve spring). The resilient member 264 is positioned in the pocket 224 and is radially outward of the ball detents 244. The resilient member 264 is configured to flex radially outwardly in response to the ball detents 244 pressing against the resilient member 264 when the tool bit 14 is being inserted into the spindle 38 to allow the ball detents 244 to move out of the locking position to the insertion position. Once the tool bit 14 is inserted far enough to align the ball detents 244 with the indentations 194, resilient member 264 can return to its unflexed state by forcing the ball detents 244 into the indentations 194.

For example, to secure the tool bit 14 within the chuck 24, the tool bit 14 is inserted within the spindle 38, causing the connector 188 of the tool bit 14 to engage the ball detents 244 to push against the resilient member 264. Because the resilient member 264 is substantially uniform, the ball detents 244 move in unison. When the ball detents 244 are moved past the first ring 256, the ball detents 244 are also displaced radially outward toward a gap 270 created between the resilient member 264 and the first ring 256 (i.e., in an insertion position; FIG. 11), until the ball detents 244 clear the connector 188 of the tool bit 14. The outward movement of the ball detents 244 causes the resilient member 264 to flex outward. The ball detents 244 and resilient member 264 are returned to the locked position shown in FIG. 12 in response to the ball detents 244 clearing the end of the tool bit 14, at which time the ball detents 244 are at least partially received in the indentations 192 of the tool bit 14 to define the extent to which the tool bit 14 may reciprocate within the spindle 38.

To release the tool bit 14 from the chuck 24, the collar 200 is pushed to the second position against the bias of the spring 204, thereby moving the first ring 256 (FIG. 13). The collar 200 no longer contacts a locked surface 233 (e.g., the retaining ring 208) and there is the gap 235 between the collar 200 and the locked surface 233. In other examples, the collar may instead contact the retaining ring 240, which may define a locked surface. The ball detents 244 become aligned with an annular recess 271 in the collar 200 adjacent the first ring 256, allowing the ball detents 244 to be displaced radially outward and into the annular recess 271 (i.e., in a release position) in response to a removal force applied to the tool bit 14. In some cases, moving the tool bit 14 out of the spindle 38 can cause the ball detents 244 to move into the annular recess 271 as the ball detents 244 contact the connector 188 of the tool bit 14.

Figure 14:
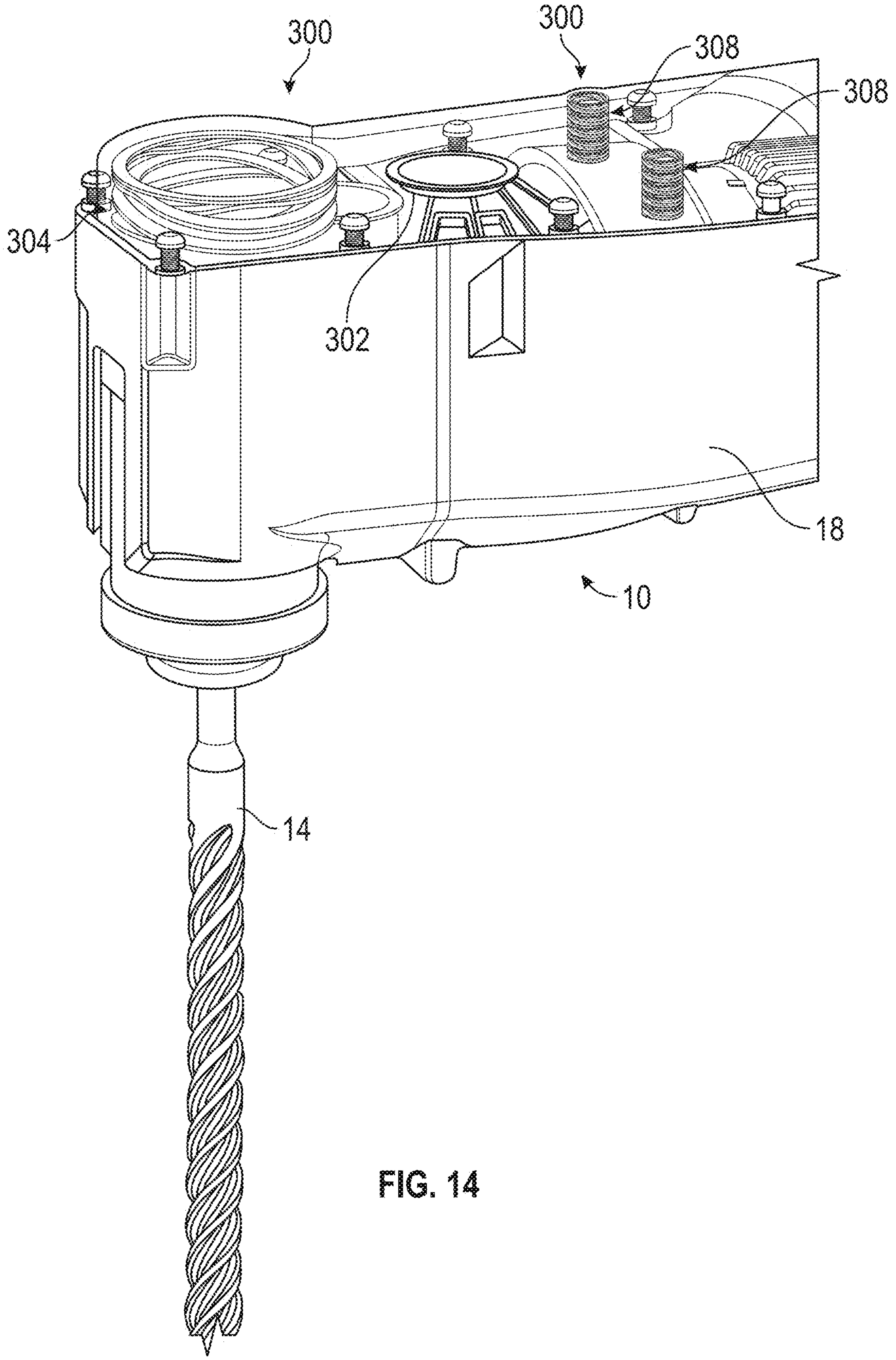
FIG. 14 is a perspective view of the rotary hammer of FIG. 1 with top cover of a housing removed to show an anti-vibration system, according to aspects of the disclosure.
Figure 15:
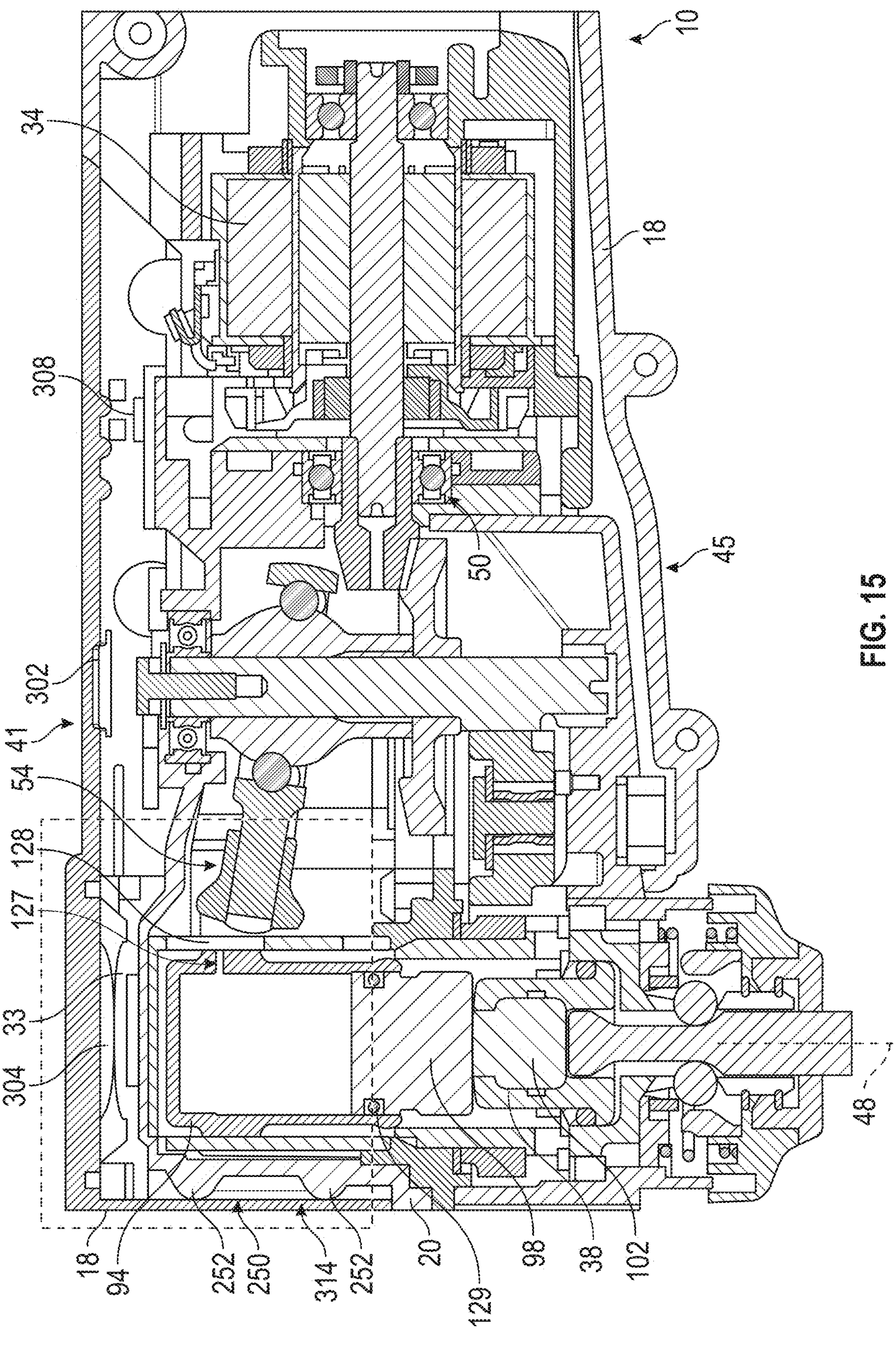
FIG. 15 is a cross-sectional view of the rotary hammer of FIG. 14.

With reference to FIGS. 14-15, the rotary hammer 10 may include an anti-vibration system 300 positioned between the housing 18 and the gear case 20. More specifically, the anti-vibration system 300 is positioned between a cover 302 of the housing 18 and the upper gear case 33. The anti-vibration system 300 includes a dampening assembly, which in this case includes a first damping assembly, in this case, configured as a first spring assembly 304 and a second damping assembly, in this case configured as a second spring assembly 308, which is spaced from the first damping assembly (e.g., the first spring assembly 304). In other examples, other types of damping assemblies can be used, for example, dashpots, bushings, etc. The first spring assembly 304 includes one or more wave springs having a relatively high spring rate. In the illustrated embodiment, the first spring 304 is a spring wave. In other examples, the first spring assembly 304 can be a stacked wave spring assembly (e.g., a spring assembly) that, collectively, defines a relatively high spring rate higher than any one of the individual wave springs within the stack. The first spring assembly 304 is positioned below the cover 302 and above a portion of the impact mechanism 54. More specifically, the first spring 304 is substantially aligned with the piston 94, the striker 98, and the anvil 102 (e.g., so the spindle axis 48 is within a perimeter of the first spring 304). The first spring 304 is shown offset axially from the spindle 38. It should be contemplated, however, that the first spring 304 can be coaxial with the piston 94, the striker 98, and the anvil 102. Further, in some examples, the first spring 304 may also be axially aligned with the spindle 38. In other examples, other spring arrangements are possible. For example, the position of the first spring 304 may be selected based on an orientation of the spindle axis 48.

The second spring assembly 308 includes two or more wave springs. In the illustrated embodiment, the second spring assembly 308 includes two wave springs (e.g., wave spring assemblies) that, collectively, define a spring rate higher than any one of the individual wave springs within the stack. The stacked wave spring assemblies of the second spring assembly 308 are smaller and have a smaller spring rate than the stacked wave spring assembly of the first spring assembly 304. The second spring assembly 308 is positioned between the first spring assembly 304 and the handle 22 (e.g., to be further from the spindle 38 than is the first spring assembly 304). More specifically, the second spring assembly 308 is positioned below the cover 302 and between the transmission 50 and the motor 34. In some embodiments, the spring rate of the first spring 304 is higher than the spring rate of the second spring assembly 308. In other embodiments, the spring rate of the first spring assembly 304 is lower than the spring rate of the second spring assembly 308. In other examples, the second spring assembly 308 can be a single spring element.

The anti-vibration system 300 is configured to allow the gear case 20 to float within the housing 18 along the spindle axis 48. In the anti-vibration system 300, the first spring assembly 304 is configured to absorb a majority of the user applied force and the second spring assembly 308 is configured to absorb less of the user-applied force. The second spring assembly 308 prevents the gear case 20 from bottoming-out against the interior of the housing 18 when the user is not directly pressing on the housing 18 above the first spring assembly 304.

The housing 18 is moveable relative to the gear case 20, in a direction along the spindle axis 48, in response to a user-applied force on the housing 18 during a hammer-drilling operation, which is applied in the direction of the spindle axis 48. The user-applied force on the housing 18 compresses the first spring assembly 304 and the second spring assembly 308. The first spring assembly 304 and the second spring assembly 308 attenuate vibration along the spindle axis 48. The amount of compression of the first spring assembly 304 and the second spring assembly 308 is determined by the location of the force that is applied to the housing 18 relative to the location of the first and second spring assemblies 304, 308. In the illustrated embodiment, the anti-vibration system 300 allows the housing 18 to move about 5.5 mm relative to the gear case 20 in the axial direction of the spindle axis 48. In some embodiments, the anti-vibration system 300 allows the housing 18 to move between about 2.0 mm to about 15.0 mm relative to the gear case 20 in the axial direction of the spindle axis 48. In some embodiments, the movement between the housing 18 and the gear case 20 may greater than about 15.0 mm. In some embodiments, the movement between the housing 18 and the gear case 20 may less than about 2.0 mm.

With continued reference to FIG. 15, the rotary hammer 10 may include a keyway 314 defined between the housing 18 and the gear case 20. In some embodiments, the keyway 314 may include a slot 250 defined in the housing 18, which receives a corresponding projection 252 defined on the gear case 20 that is positioned in the slot 250. In some embodiments, the slot 250 may be defined in the gear case 20 and the projection 252 may be defined on the housing 18. The slot 250 and the projection 252 can have a sliding fit such that the projection 252 can slide along the slot 250. The keyway 314 limits the axial movement of the housing 18 relative to the gear case 20 along the spindle axis 48.

In some cases, a lever can be coupled to a rotary hammer to allow a user to apply increased force to the rotary hammer when drilling in tight spaces. The lever can be moved by a user to engage a support surface (e.g., a non-drilling surface), allowing the user to leverage force off of the support surface. For example, when operating in an open space, a user may be able to apply force directly to a housing of the rotary hammer proximate a location of a spindle axis. However, in tight spaces, a user may be unable to fit a hand between an obstructing support surface and the tool housing. In such cases, the user can attach a lever to the housing. A first end of the lever can extend into a gap between the housing and the support surface while a second end of the lever can extend out of the gap to me manipulated by a user (e.g., as an auxiliary handle). The user can apply force to the second end of the lever to cause the first end to engage with the support surface, which thereby causes a reaction force to be applied to the rotary hammer in the drilling direction (e.g., along a spindle axis). In some cases, the lever can provide the user with a mechanical advantage that multiplies the force input by the user.

Figure 16:
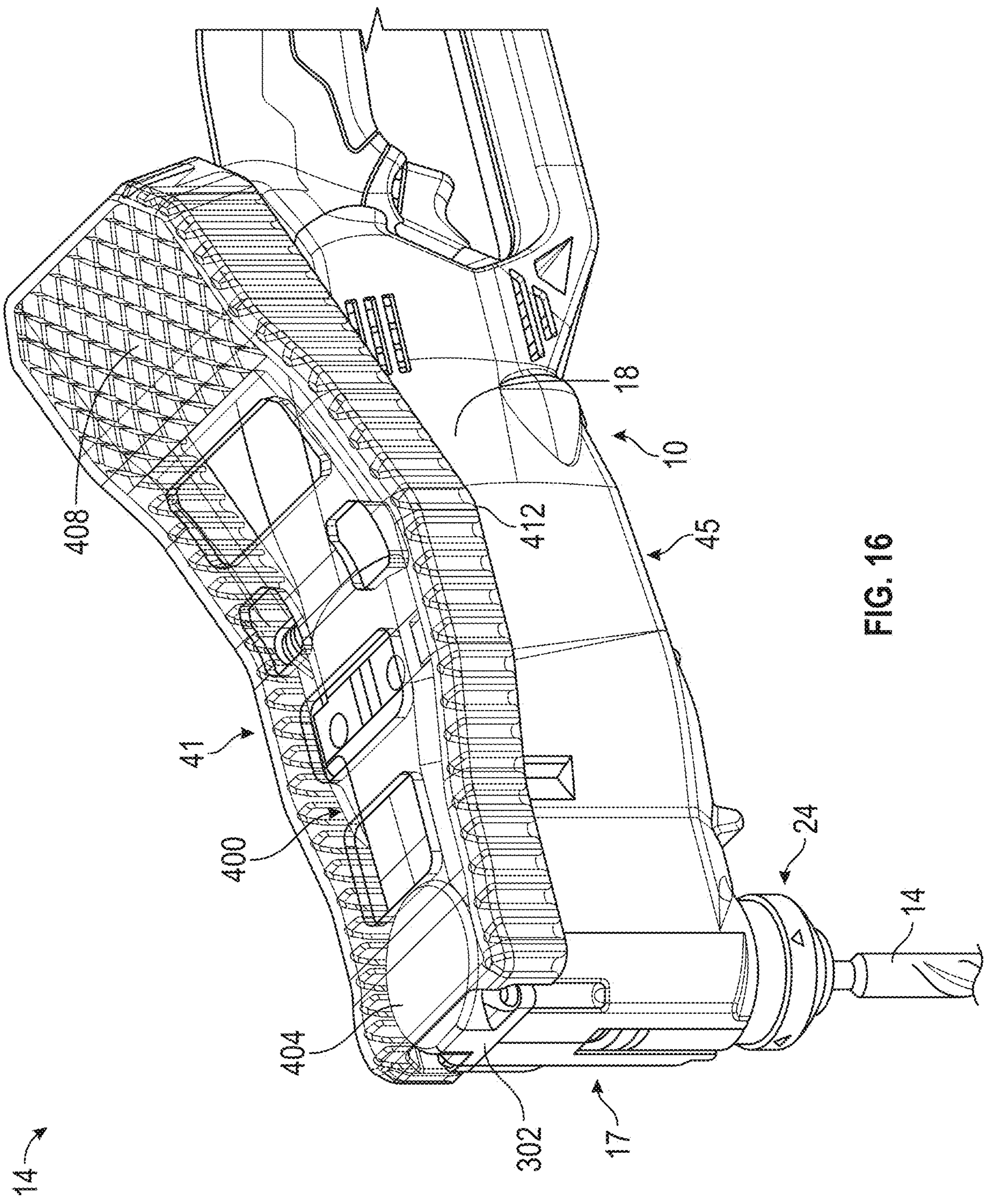
FIG. 16 is perspective view of the rotary hammer of FIG. 1 including a lever attached thereto.
Figure 17A:
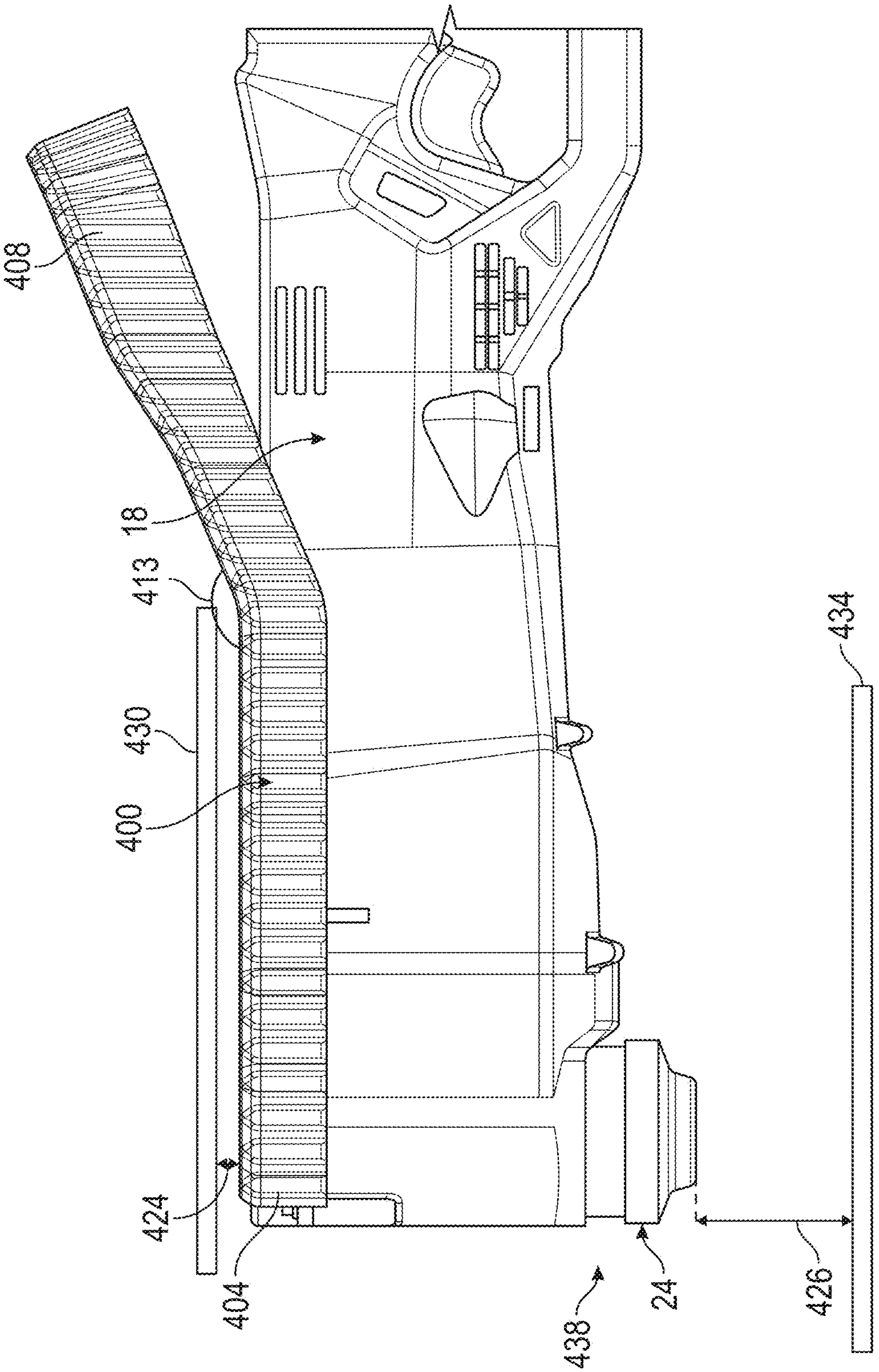
FIG. 17A is a side view of the rotary hammer of FIG. 16, illustrating the lever in a first position.
Figure 17B:
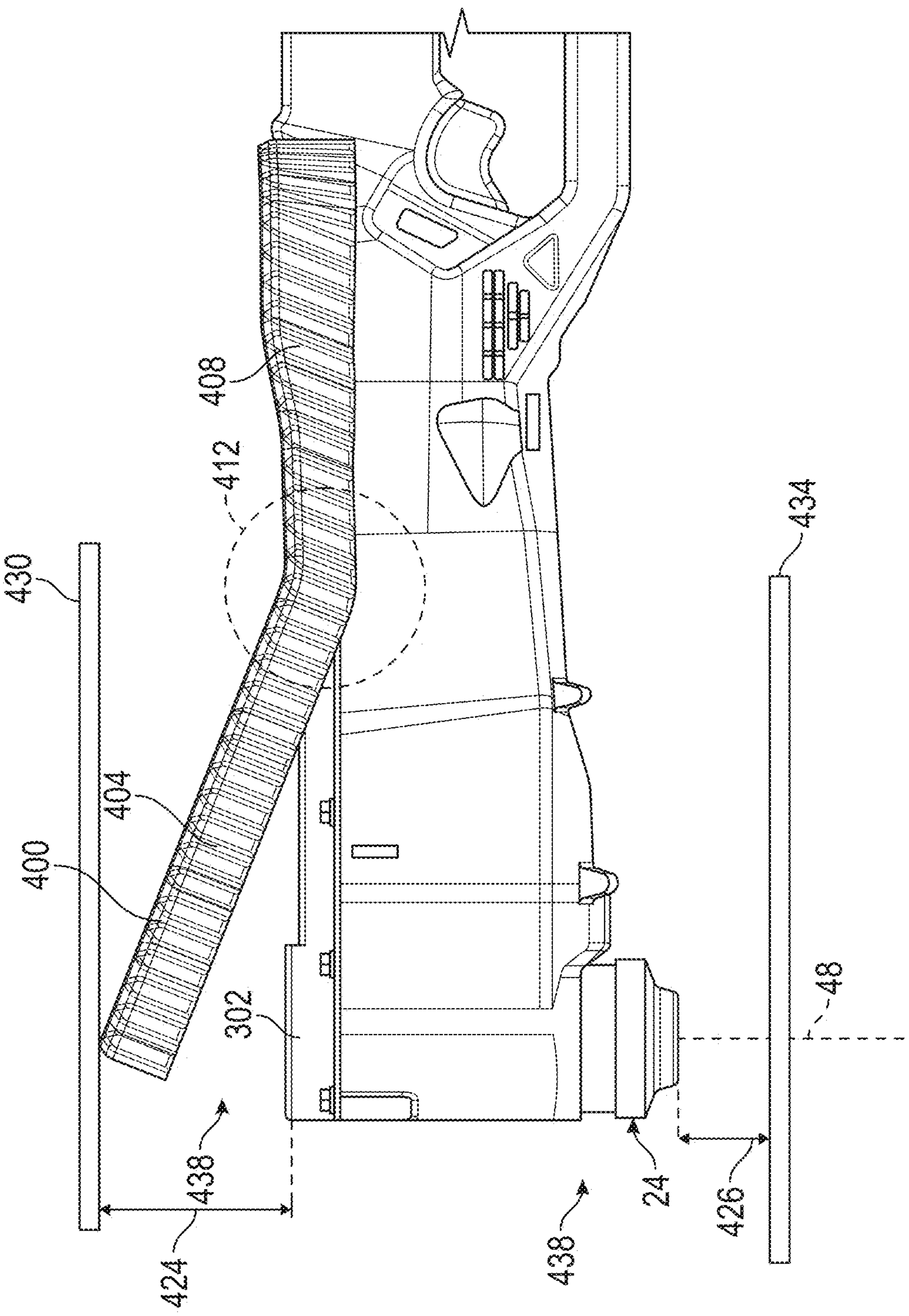
FIG. 17B is a side view of the rotary hammer of FIG. 16, illustrating the lever moved to a second position.
Figure 18:
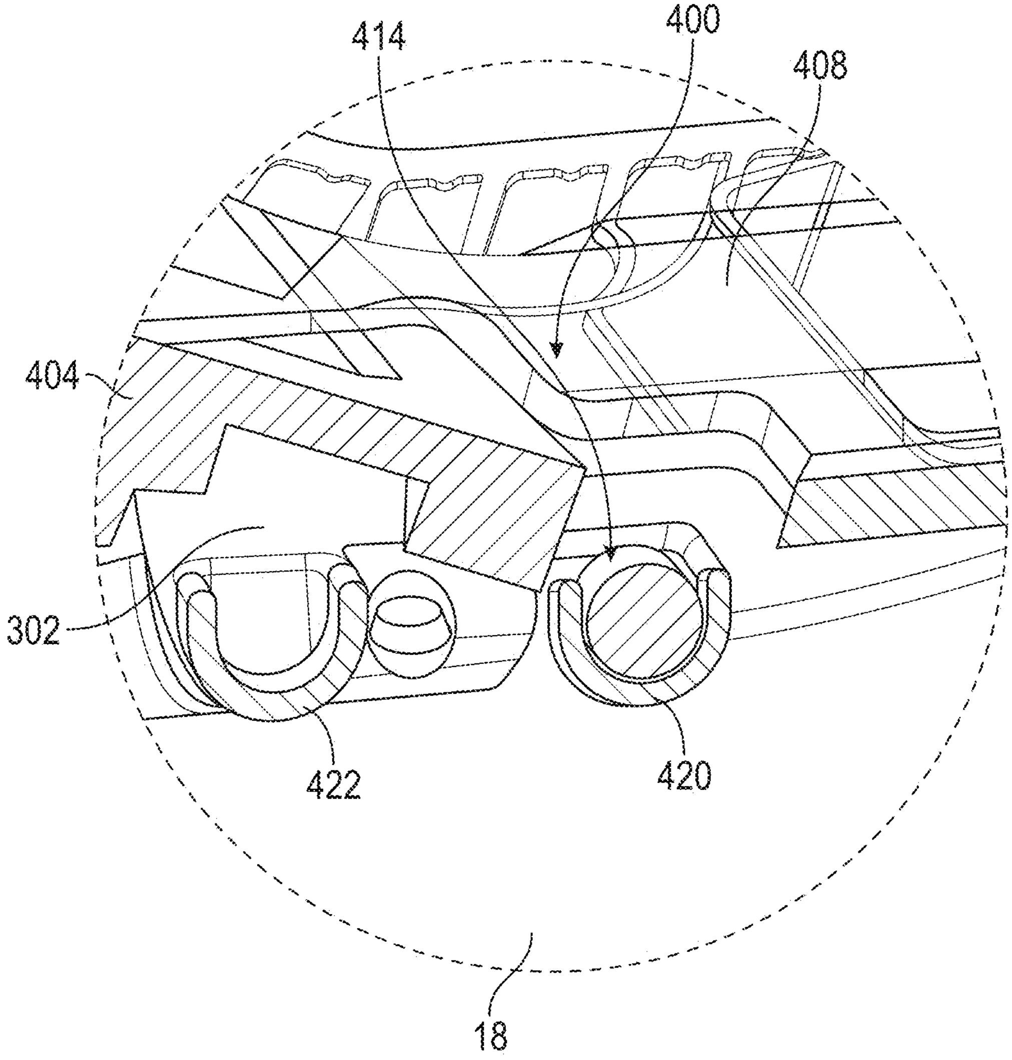
FIG. 18 is a detail, cross-sectional view of the rotary hammer and lever of FIG. 16, illustrating a pivot joint coupling the lever to the rotary hammer.

For example, turning to FIGS. 16-18, the rotary hammer 10 may include a lever 400 pivotably coupled to the housing 18. In the illustrated embodiment, the lever 400 extends along the length of housing 18. The lever 400 is V-shaped and includes a first arm 404 extending along the cover 302 (e.g., toward the spindle 38), a second arm 404 extending away from the first arm 404 (e.g., to extend away from the spindle 38) at an angle 413, and an apex 412 (FIG. 17B) therebetween. In some embodiments, the angle 413 is between about 90 and 180 degrees, between about 140 degrees and 160 degrees, between about 100 degrees and 170 degrees, or other ranges therein. In some embodiments, the cover 302 is coupled to the rotary hammer 10 and further coupled to the anti-vibration system 300. The lever 400 is pivotably coupled to the housing 18 at the apex 412. The first arm 404 and the second arm 404 are shown having different lengths (e.g., in a direction moving away from the apex 412), but can also be configured to have different lengths to adjust the mechanical advantage given by the lever 400. The lever 400 is configured to move between a first position (FIG. 17A) and a second position (FIG. 17B). In the first position, when the lever mechanism 400 is unpressed, the first arm 404 rests on the cover 302 while the second arm 404 is raised (e.g., moved away from the cover 302) from the housing 18. In the second position, when the lever mechanism 400 is pressed, the first arm 404 is moved away from the housing 18 (e.g., to engage a support surface), while the second arm 404 is moved toward the housing 18.

FIG. 18 is an enlarged view of the lever 400 near the apex 412. A pin 414 is used to pivotably couple the lever 400 to the housing 18. In that regard, the pin 414 acts as a fulcrum for the lever 400. In some embodiments, the pin 414 is received in a support 420 defined in the housing 18 (e.g., via a snap-fit or other type of connection). The support 420 allows the pin 414 to rotate within the support 420 so that the lever 400 can pivot between the first and second positions. The pin 414 also allows the lever 400 to be easily removed or installed from the rotary hammer 10. In some embodiments, the cover 302 of the housing 18 includes a second support 422 that allows the lever 400 to be positioned in a different position between the spindle axis 48 and the handle 22 compared to the position of the lever 400 shown in FIG. 18. This can allow a user to adjust a position of the lever 400 so that the lever 400 can be optimally positioned to engage a support surface to increase the amount of force that a user can apply to the rotary hammer 10 when drilling.

As mentioned above, and with reference to FIGS. 17A and 17B, the lever 400 can help a user to apply force to the rotary hammer 10 along the spindle axis 48 in tight spaces by levering off of an obstructing support surface 430 and forcing the tool bit 14 into a drilling surface 434 (e.g., a workpiece). The rotary hammer 10 can be positioned with the lever 400 in the first position so that the first arm 404 is positioned in a gap 438 between the support surface 430 and the drilling surface 434, while the second arm 404 is positioned outside of the gap 438 to be manipulated by a user. A drilling space 426 (e.g., a first space) is between the rotary hammer and the drilling surface 434 (e.g., the drilling space is between the chuck 24 and the drilling surface 434). Continuing, a support space 424 (e.g., a second space) is defined between the rotary hammer and the support surface 430 (e.g., the support space is between the lever 400 and the support surface 430).

To apply force to the rotary hammer 10, the user moves the second arm 404 toward the housing 18 (e.g., toward the second position), which causes the lever 400 to pivot at the pin 410 so that the first arm 404 is moved away from the housing 18 and urged into contact with the support surface 430. This generates a reaction force that is applied to the rotary hammer 10 at pin 410 in the direction of drilling (e.g., along the spindle axis 48), thereby applying force to the rotary hammer 10 and plunging the tool bit 14 into the drilling surface 434.

In effect, this causes the lever 400 to increase the support space 424 between housing 18 of the rotary hammer 10 and the support surface 430 (e.g., a wall or a piece of machinery) in order to allow the user to apply a force to the housing 18 of the rotary hammer 10 along the spindle axis 48. Correspondingly, pivoting the lever 400 causes the drilling space 426 to decrease, bringing the spindle and tool bit closer to the drilling surface 434. Further, in some embodiments, the support space 424 is increased by the same amount (e.g., length) that the drilling space 426 is decreased. The lever 400 may be sized to allow a user to create at least 60 mm of space 424 between the cover 302 of the housing 18 and the support surface. In other examples, the lever 400 can be sized differently to create different amounts of space, for example, between about 20 mm and about 100 mm, or more, or less. In some embodiments, after the lever 400 has created space (e.g., increased the support space 424), the user may return the lever 400 to the first position, and the user may then push on a portion of the lever 400 proximate the second end 17 apply a force to the housing 18 of the rotary hammer 10 along the spindle axis 48.

Various features of the disclosure are set forth in the following claims.

What is claimed is:

1. A rotary hammer configured to impart impacts to a tool bit, the rotary hammer comprising:
   - a housing including a first end having a handle and a second end configured to receive the tool bit, the housing extending along a first direction between the first end and the second end;
   - a motor disposed within the housing;
   - a spindle disposed within the housing and rotatable by the motor, the spindle defining a spindle axis that is transverse relative to the first direction;
   - an impact mechanism including:
     - a piston at least partially received within the spindle for reciprocation therein, the piston including a pivot joint on an outer circumferential surface of the piston, and
     - a striker received within the piston for reciprocation in response to reciprocation of the piston; and
   - an oscillation mechanism configured to convert rotational motion of the motor into reciprocating linear motion that moves the piston, the oscillation mechanism including a wobble assembly having a wobble bearing.

2. The rotary hammer of claim 1, wherein the spindle axis is substantially perpendicular to at least one of the first direction and an axis of the motor.

3. The rotary hammer of claim 1, wherein the handle defines a handle axis that is substantially parallel to the first direction.

4. The rotary hammer of claim 3, wherein the handle axis is at an angle of less than about 10 degrees from the first direction.

5. The rotary hammer of claim 1, wherein an actuator is arranged the handle so that an activation direction of the actuator is substantially parallel with the spindle axis.

6. The rotary hammer of claim 1, further comprising a sleeve positioned in the housing and coaxial with the spindle, wherein the piston is configured to reciprocate within the sleeve and the spindle.

7. The rotary hammer of claim 6, wherein the sleeve is rotationally fixed relative to the housing and is coupled to the spindle by a collar.

8. The rotary hammer of claim 1, wherein the impact mechanism further includes an anvil and the striker is moveably disposed within a cavity defined in the piston, the striker moving to contact the anvil to impart the impacts to the tool bit.

9. The rotary hammer of claim 1, wherein the wobble bearing is rotated by an intermediate shaft of a transmission that transmits torque from the motor to the spindle.

10. The rotary hammer of claim 9, wherein a rotational axis of the wobble bearing is at least one of substantially parallel to the spindle axis and substantially perpendicular to the first direction.

11. The rotary hammer of claim 1, further comprising a gearcase that is disposed in the housing, the spindle and the impact mechanism being disposed in the gearcase.

12. The rotary hammer of claim 1, further comprising a lever that is pivotally coupled to the housing.

13. A rotary hammer configured to impart impacts to a tool bit, the rotary hammer comprising:
   - a housing including a first end having a handle and a second end having a chuck, the handle defining a handle axis;
   - a motor disposed within the housing;
   - a spindle disposed within the housing and rotatable by the motor, the spindle defining a spindle axis that is transverse to the handle axis;
   - a transmission configured to transfer torque from the motor to the spindle;
   - an impact mechanism including:
     - a piston at least partially received within the spindle for reciprocation therein, and a striker received within the spindle and configured to impart an impact to the tool bit in response to reciprocation of the piston; and
   - an oscillation mechanism including a wobble assembly coupled between the transmission and the impact mechanism to convert rotational motion of the motor into reciprocating linear motion that moves the piston, the oscillation mechanism coupled to a peripheral side surface of the piston.

14. The rotary hammer claim 13, wherein the handle axis is an angle of less than about 15 degrees relative to a first direction extending from the first end of the housing to the second end of the housing.

15. The rotary hammer of claim 13, wherein the motor includes a shaft defining a shaft axis that is substantially orthogonal to at least one of the spindle axis and the handle axis.

16. The rotary hammer of claim 13, wherein the handle includes a trigger having a pull direction that is substantially parallel to the spindle axis.

17. The rotary hammer of claim 13, wherein the chuck is moveable along the spindle axis between a first position configured to retain the tool bit and a second position configured to release the tool bit.

18. A rotary hammer configured to impart impacts to a tool bit, the rotary hammer comprising:
   - a housing including a first end having a handle and a second end configured to receive the tool bit, the housing extending along a first direction between the first end and the second end and the handle defining a handle axis that is substantially parallel to the first direction;
   - an output assembly disposed in the housing at the second end, the output assembly including:
     - a spindle configured to rotate the tool bit about a spindle axis that is substantially perpendicular to the first direction;
     - an impact mechanism including a piston at least partially received within the spindle for reciprocation therein,
     - an oscillation mechanism coupled at an outer surface between a first end and a second end of the piston and is configured to reciprocate the piston, the oscillation mechanism including a wobble assembly having a wobble bearing,
     - a striker received within the spindle for reciprocation in response to reciprocation of the piston; and
     - a transmission configured to transmit an input torque to the spindle and the impact mechanism; and
   - a motor positioned between the output assembly and the handle to provide the input torque to the transmission.

* * * * *